(12) United States Patent
Ispir

(10) Patent No.: US 8,136,063 B2
(45) Date of Patent: Mar. 13, 2012

(54) UNFOLDING ALGORITHM IN MULTIRATE SYSTEM FOLDING

(75) Inventor: Mustafa Ispir, Ankara (TR)

(73) Assignee: Synopsys, Inc., Mountain View, CA (US)

( * ) Notice: Subject to any disclaimer, the term of this patent is extended or adjusted under 35 U.S.C. 154(b) by 562 days.

(21) Appl. No.: 12/271,733

(22) Filed: Nov. 14, 2008

(65) Prior Publication Data

US 2010/0125820 A1    May 20, 2010

(51) Int. Cl.
*G06F 17/50* (2006.01)

(52) U.S. Cl. ........ 716/104; 716/103; 716/107; 716/132; 703/16

(58) Field of Classification Search .................. 716/102, 716/104, 107, 132; 703/16
See application file for complete search history.

(56) References Cited

U.S. PATENT DOCUMENTS

| | | | | |
|---|---|---|---|---|
| 5,502,645 | A * | 3/1996 | Guerra et al. | 716/104 |
| 6,745,160 | B1 * | 6/2004 | Ashar et al. | 703/14 |
| 6,772,399 | B2 * | 8/2004 | Saluja et al. | 716/103 |
| 6,941,541 | B2 * | 9/2005 | Snider | 716/103 |
| 7,017,043 | B1 * | 3/2006 | Potkonjak | 713/176 |
| 7,085,702 | B1 * | 8/2006 | Hwang et al. | 703/15 |
| 7,107,568 | B2 * | 9/2006 | Cronquist | 716/103 |
| 7,200,837 | B2 * | 4/2007 | Stevens | 717/114 |
| 7,383,166 | B2 * | 6/2008 | Ashar et al. | 703/14 |
| 7,472,359 | B2 * | 12/2008 | Ciesielski et al. | 716/130 |
| 7,958,476 | B1 * | 6/2011 | Jiang et al. | 716/109 |
| 8,001,500 | B2 * | 8/2011 | Koelbl et al. | 716/104 |
| 8,001,510 | B1 * | 8/2011 | Miller et al. | 716/116 |
| 2002/0026305 | A1 | 2/2002 | Boca et al. | |
| 2002/0188922 | A1 | 12/2002 | Ginneken et al. | |
| 2003/0061576 | A1 | 3/2003 | Saluja et al. | |
| 2004/0111684 | A1 | 6/2004 | Masuda | |
| 2006/0156260 | A1 * | 7/2006 | Ciesielski et al. | 716/3 |
| 2007/0214447 | A1 | 9/2007 | Okada | |

OTHER PUBLICATIONS

PCT/US2009/064257, International Search Report and Written Opinion, Date of Mailing Jun. 28, 2010, 13 pages.
Denk, Tracy C., et al., "Synthesis of Folded Pipelined Architectures for Multirate DSP Algorithms", IEEE Transactions on Very Large Scale Integration (VLSI) Systems, vol. 6, No. 4, pp. 595-607, (Dec. 1998).
Parhi, Keshab K., "Chapter 4—Retiming", VLSI Digital Signal Processing Systems: Design and Implementation, Wiley-Interscience, pp. 91-118, (1999).

(Continued)

*Primary Examiner* — Phallaka Kik
(74) *Attorney, Agent, or Firm* — Blakely, Sokoloff, Taylor & Zafman LLP; Judith A. Szepesi

(57) ABSTRACT

Methods and apparatuses to optimize a circuit representation using unfolding as a preprocessing of the multirate folding. In at least one embodiment of the present invention, a portion of a data flow graph representation of a circuit is optimized using circuit operation level before using optimizing with data flow algorithm and mapping the design onto hardware. In an aspect, the present invention discloses circuit operation level optimization for data flow graph representations with optimizing zero inputs caused by the upsamplers, or with optimizing unused outputs caused by the downsamplers. In at least one embodiment of the present invention, multirate data graph is converted to a single rate data graph before data flow optimizing. In an aspect, converting a multirate data graph to a single rate data graph comprises unfolding the multirate data graph with minimum unfolding factors that are inversely proportional to the clock values.

57 Claims, 22 Drawing Sheets

OTHER PUBLICATIONS

Parhi, Keshab K., "Chapter 5—Unfolding", VLSI Digital Signal Processing Systems: Design and Implementation, Wiley-Interscience, pp. 119-148, (1999).

Parhi, Keshab K., "Chapter 6—Folding", VLSI Digital Signal Processing Systems: Design and Implementation, Wiley-Interscience, pp. 149-187, (1999).

* cited by examiner $y[n] = a\,y[n-1] + x[n]$

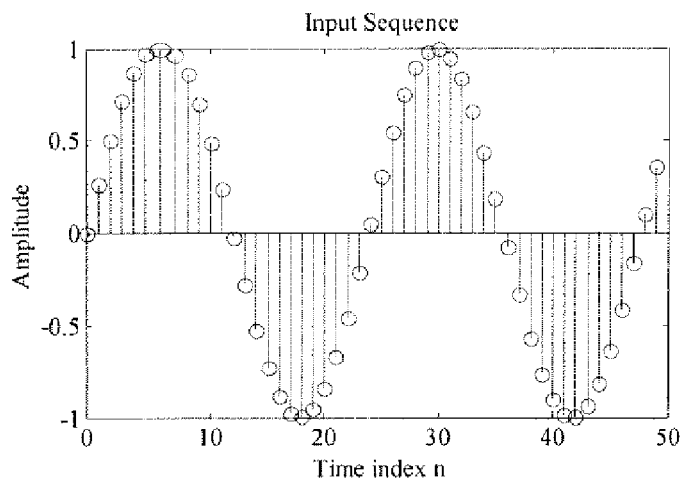
Fig. 11A
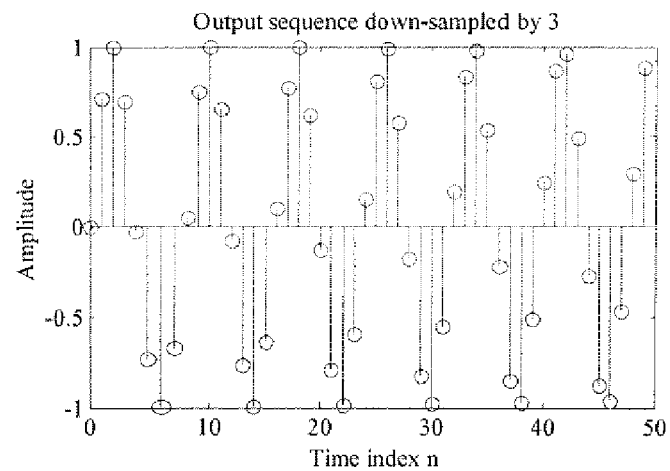
Fig. 11B
x[3k] ⟶ y[3k]
x[3k+1] ⎯⎯ ✕
x[3k+2] ⎯⎯ ✕
Fig. 11C

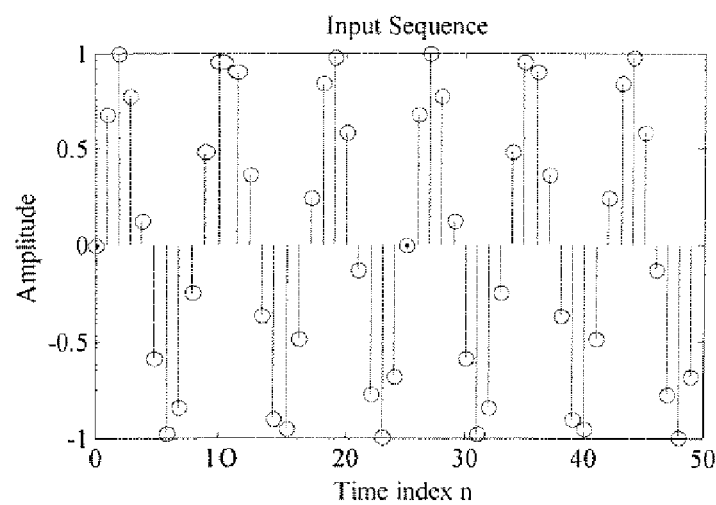
Fig. 12A
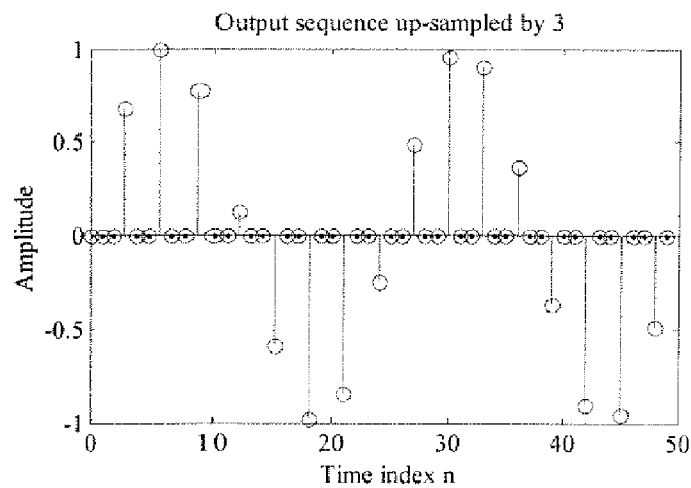
Fig. 12B
x[3k] ⟶ y[3k]
0 ⟶ y[3k+1]
0 ⟶ y[3k+2]
Fig. 12C

UNFOLDING ALGORITHM IN MULTIRATE SYSTEM FOLDING

FIELD OF THE INVENTION

The invention relates to circuit design, and more particularly to the circuit optimization of design representations.

BACKGROUND

For the design of digital circuits (e.g., on the scale of Very Large Scale Integration (VLSI) technology), designers often employ computer aided techniques. Standard languages such as Hardware Description Languages (HDLs) have been developed to describe digital circuits to aid in the design and simulation of complex digital circuits. Several hardware description languages, such as VHDL and Verilog, have evolved as industry standards. VHDL and Verilog are general purpose hardware description languages that allow definition of a hardware model at the gate level, the register transfer level (RTL) or the behavioral level using abstract data types. As device technology continues to advance, various product design tools have been developed to adapt HDLs for use with newer devices and design styles.

In designing an integrated circuit with an HDL code, the code is first written and then compiled by an HDL compiler. The HDL source code describes at some level the circuit elements, and the compiler produces an RTL netlist from this compilation. The RTL netlist is typically a technology independent netlist in that it is independent of the technology/architecture of a specific vendor's integrated circuit, such as field programmable gate arrays (FPGA) or an application-specific integrated circuit (ASIC). The RTL netlist corresponds to a schematic representation of circuit elements (as opposed to a behavioral representation). A mapping operation is then performed to convert from the technology independent RTL netlist to a technology specific netlist which can be used to create circuits in the vendor's technology/architecture. It is well known that FPGA vendors utilize different technology/architecture to implement logic circuits within their integrated circuits. Thus, the technology independent RTL netlist is mapped to create a netlist which is specific to a particular vendor's technology/architecture.

One operation, which is often desirable in this process, is to plan the layout of a particular integrated circuit and to control timing problems and to manage interconnections between regions of an integrated circuit. This is sometimes referred to as "floor planning." A typical floor planning operation divides the circuit area of an integrated circuit into regions, sometimes called "blocks," and then assigns logic to reside in a block. These regions may be rectangular or non-rectangular. This operation has two effects: the estimation error for the location of the logic is reduced from the size of the integrated circuit to the size of the block (which tends to reduce errors in timing estimates), and the placement and the routing typically runs faster because as it has been reduced from one very large problem into a series of simpler problems.

Significant optimization efforts have been devoted to assignment of resources and resource utilization. Circuit level optimization contributes significantly to the optimum design, including circuitry modification and re-placement to achieve desired timing and desired area. For example, circuit placement related optimizations include adder tree or gate decomposition, logic replication, bit slicing and detour removal.

In addition, advances in data flow programs for digital signal processing has provided significant progress in circuit optimization using data flow graphs, especially for parallel computers. A data flow graph representation is a popular hardware and software methodology where algorithms are described as directed graphs with nodes representing computations (or functions or subtasks) and edges representing data paths (communications between nodes) Data flow algorithm is mainly concerned with the flow of data and not with the actual computation process, and is a natural paradigm for describing digital signal processing applications for concurrent implementation on parallel hardware. For concurrent implementations, a task is broken into subtasks which are then scheduled onto parallel processors.

For example, FIG. 1A illustrates a circuit block diagram describing the computation $y[n]=ay[n-1]+x[n]$. This is a feedback function where the computational output $y[n]$ depends on the value of its previous output $y[n-1]$. The block diagram shows a delay block D, which can be a delay register, to store the previous value of the output y. A multiplication block X is provided to multiply the delay output $y[n-1]$ and a constant a. An addition block+is provided to add the input $x[n]$ with the multiplied delay output $ay[n-1]$. A key feature of a circuit block diagram is that the functionality of the circuit can be understood and derived from the circuit block diagram. For example, the computation $y[n]=ay[n-1]+x[n]$ can be calculated from the circuit block diagram of FIG. 1A at a circuit operation level.

FIG. 1B illustrates a data flow graph of this block diagram with node A representing the addition block and node B representing the multiplication block. The edge from B to A (B→A) represents the data path from the multiplication block to the addition block, and the edge from A to B (A→B) represents the data path from the addition block to the multiplication block. The delay D is inserted to the data path from A to B to show that the edge from A to B (A→B) contains one delay (e.g., 1 clock cycle delay). The input branch $x[n]$ and the output branch $y[n]$ are shown in dotted lines, mainly for an illustration of the correlation with the block diagram of FIG. 1A. In practice, the input and output branches are typically not shown in a data flow graph (e.g., FIG. 1C). Alternatively, the delay D can be shown in the vicinity of the edge (FIG. 1C).

Other information can be included in the data flow graph, for example, information related to synchronous data flow graph to show that execution of nodes A and B consumes one data sample and produces output. This is illustrated by a number 1 from the edge coming to node A/B and a number 1 from the edge coming out of node A/B. Each node can have an execution time associated with it, for example, the amount of time required to execute node A (addition computation) is 2 time units (e.g., 2 clock cycles), and the amount of time required to execute node B (multiplication computation) is 4 time units. This is illustrated by a number in parentheses (2) and (4) in the vicinity of nodes A and node B, respectively.

Typically, operations of a data flow graph at a data flow level are operations related only to the data flow without regard to functional or computational operations. For example, the critical path of a data flow graph is defined to be the path with the longest computation time among all paths that contain zero delay. Thus the critical path in the data flow graph shown in FIG. 1B is the path B→A, which requires 6 time units. Optimizing the critical path is an example of optimizing a data flow graph at a data flow level.

The illustrated data flow graph describes a single rate system where all nodes consume one data sample and produce one output relative to a clock cycle. In multirate systems, the number of data samples consumed and produced can be different than 1, such as in a system where the nodes operate at different frequencies or a decimator or an interpolator. For example, a ↓2 decimator rejects every other data sample, thus producing one data output for every 2 data samples consumed. A ↑2 interpolator introduces an addition data output for every data sample, thus producing ↑2 data outputs for every 1 data sample consumed.

In addition to being natural to digital signal processing, a data flow graph representation has another advantage of generating the same results for any implementations of the data flow description, as long as the integrity of the flow of data is preserved. Thus data flow graph representations can be an indispensable tool in scheduling and mapping circuit design representation onto hardware. The current data flow graph representations employ nodes and edges, together with using linear programming to optimize the flow of data to achieve a desired clock. Information related to actual circuitry is not relevant and in general, no longer presented in the data flow graph representations.

SUMMARY OF THE DESCRIPTIONS

The present invention relates to methods and apparatuses to design a circuit, and particularly to optimization processes for digital circuit representations.

In an embodiment, the present invention discloses optimizing a portion of a data flow graph representation of a circuit at a circuit operation level to produce a data flow graph, in addition to the optimization of the data flow graph representation at a data flow level. The data flow graph representation to be optimized at a circuit operation level can be a circuit block diagram or a data flow graph, which is preferably converted to a circuit block diagram before undergoing optimization at a circuit operation level. The resulting data flow graph after being optimized at a circuit operation level can be data flow graph or a circuit block diagram, which is preferably converted to a data flow graph before undergoing optimization at a data flow level. In an aspect, the data graph representation is optimized at a circuit operation level before optimizing at a data flow level to produce an optimized data flow graph.

Data low level optimization typically modifies the data flow paths, including removing or introducing one or more delay registers to achieve a desired timing. Data flow level operations generally operate on the flow of data, for example, the availability of input data for optimum parallel processor operations. A data flow algorithm is thus generally not concerned with circuit or operational level, but only concerned with data flow paths. Data flow level optimization generally includes folding a portion of the data flow graph for smaller footprint, retiming a portion of the data flow graph for better timing, and finding an optimum scheduling algorithm for mapping the data flow graph to programmable hardware devices.

In contrast, circuit operation level optimization modifies the circuit using logical equivalent circuitry to achieve a desired objective such as simpler circuit, less components, small footprint, or a desired timing. Circuit operation level optimization generally operates on the circuit components, and thus modifying the circuit while preserving the functionality.

In an embodiment, the present invention introduces circuit operation level optimization to data flow graphs to better optimize the circuit representation before mapping the design onto hardware. In an aspect, after the design representation is optimized using circuit operation level, the design representation can be further optimized using data flow graph algorithms, such as folding, retiming, and scheduling for hardware mapping. For example, retiming optimization can include adding a number of pipeline register sets to a portion of the circuit or removing a number of pipeline register sets from a portion of the circuit.

After optimizing the data flow graph at a circuit operation level and at a data flow level to produce an optimized data flow graph, the present method further comprises mapping the optimized data flow graph onto hardware, such as mapping the optimized data flow graph to a programmable hardware device, implementing the optimized data flow graph to a circuit, and scheduling the optimized data flow graph to one of a single processor, a multiprocessor, sequential processors, and parallel processors.

In an embodiment, a data flow graph representation is typically represented by nodes and edges, and thus might not provide circuit block details for circuit operation level optimization. In an aspect, the present invention converts a portion of the data flow graph representation of a circuit to circuit block diagram for ease of circuit operation level optimization. The circuit block diagram can be converted back to data flow graph representation for subsequent data flow algorithm optimizations.

The conversion from block diagram to data flow graph representation can include converting functional devices or blocks to nodes and data path to edges. The conversion from data flow graph representation to block diagram can include converting nodes representing circuit functions to the equivalent circuit functional devices or blocks; and converting edges to data path. Since the data flow graph typically does not include detail circuitry, additional information might be needed to allow the conversion of nodes to functional blocks.

In a preferred embodiment, the present invention discloses an optimization algorithm for a data graph representation of a multirate DSP system. In an aspect, the present method converts the multirate data graph to a single rate data graph before data path optimizing. Circuit operation level optimization can then be applied to the converted single rate data graph before data flow level optimization. Since the circuit optimized data graph is a single rate data graph, data flow level operations using single rate algorithm can be used to optimize the design representation.

Single rate optimization typically includes scheduling, folding equation calculation and retiming. Scheduling is assigning the operations to the hardware resources. Folding equations are used to determine the delay values and switches between hardware components. Retiming is used to make the scheduling feasible. To optimize multirate system directly, multirate optimization mainly depends on calculation of folding equation of the paths passed through the rate changers (e.g., upsamplers or downsamplers). Multirate property of the system should be considered in the schedule algorithm and the folding equation calculations, resulting in a more complicated with less chance of finding an optimum scheduling and mapping to hardware components.

Single rate scheduling is a more extensive studied topic and there exist more efficient optimization algorithms than multirate scheduling. With the present converted single rate data graph, it can leverage these efficient algorithms and thus can find a better scheduling.

In an embodiment, the present converting a multirate data graph to a single rate data graph comprises unfolding the multirate data graph with proper factors. The unfolding is preferably unfolding the clock domains within the multirate data flow graph with unfolding factors that are inversely proportional to the clock values. This approach can be better than generating the single rate system with folding each clock domain with a folding factor that is linearly proportional with the clock.

In an embodiment, after the conversion to single rate, for example, by unfolding the multirate system with a least multiple unfolding factor that is inversely proportional with the clock values, the converted single rate system is optimized at a circuit operation level. In an aspect, the present optimizing a data flow graph at a circuit operation level comprises first converting a node representing a circuit function of the data flow graph to the equivalent circuit function before optimizing the data flow graph at a circuit operation level. Circuit operation level optimization can include optimizing using logical equivalent circuitry, preferably for digital design such as rate changers, resamplers, decimators and interpolators. For example, in interpolator representations, zero inputs are introduced for upsampling the signals. In an aspect, the present invention discloses circuit operation level optimization for data flow graph representations with optimizing zero inputs caused by the upsamplers. Also, in decimator representations, outputs are terminated or unused for downsampling the signals. In an aspect, the present invention discloses circuit operation level optimization for data flow graph representations with optimizing unused outputs caused by the downsamplers.

In an embodiment, the present optimizing a data flow graph at a circuit operation level can be applied to a rate changer portion of a design circuit. Rate changers can introduce redundant operations, and thus in an embodiment, the present invention discloses an optimization process including a circuit operation level optimization to at least eliminate the redundant operations which, for example, caused by the conversion of rate changer behaviors, such as zero inputs or unused outputs.

In an embodiment, a rate changer portion of a data flow graph representation of a design circuit is unfolded to a single rate data flow graph representation. Then the zero inputs and/or the unused outputs resulted from the unfolding operation of the rate changer portion are optimized at a circuit operation level to produce a circuit-optimized data flow graph. The circuit-optimized data flow graph then can undergo optimization at a data flow level optimization before mapping onto hardware.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 11A-11C illustrate an exemplary downsampler.

FIGS. 12A-12C illustrate an exemplary upsampler.

DETAILED DESCRIPTION OF THE PREFERRED EMBODIMENTS

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to "an" or "one embodiment" in the present disclosure are not necessary to the same embodiment; and, such references mean at least one.

At least one embodiment of the present invention seeks to convert a multirate digital signal system to a single rate digital signal system before mapping the design representation onto hardware components. Single rate design representations are simpler with well-studied optimization algorithms, thus it is easier to find a better scheduling than the corresponding multirate system. In an aspect, the conversion unfolds the different clock domains in the multirate system with a minimum unfolding factor that is inversely proportional with the clock values so that the whole system becomes single rate.

In another embodiment, the present invention seeks to optimize a data flow representation with an operation level optimization before scheduling, folding, retiming or mapping to hardware components. The circuit optimization based on operation level can be particularly useful in conjunction with the conversion of the multirate system. For example, the conversion of resamplers such as decimators or interpolators can introduce redundant logics such as zero inputs caused by upsamplers and unused outputs caused by downsamplers. The operation level optimization according to an embodiment of the present invention can eliminate the wasted operations caused by single rate conversions reducing manually optimization.

Many of the methods of the present invention may be performed with a digital processing system, such as a conventional, general-purpose computer system. Special purpose computers, which are designed or programmed to perform only one function, may also be used.

Figure 2:
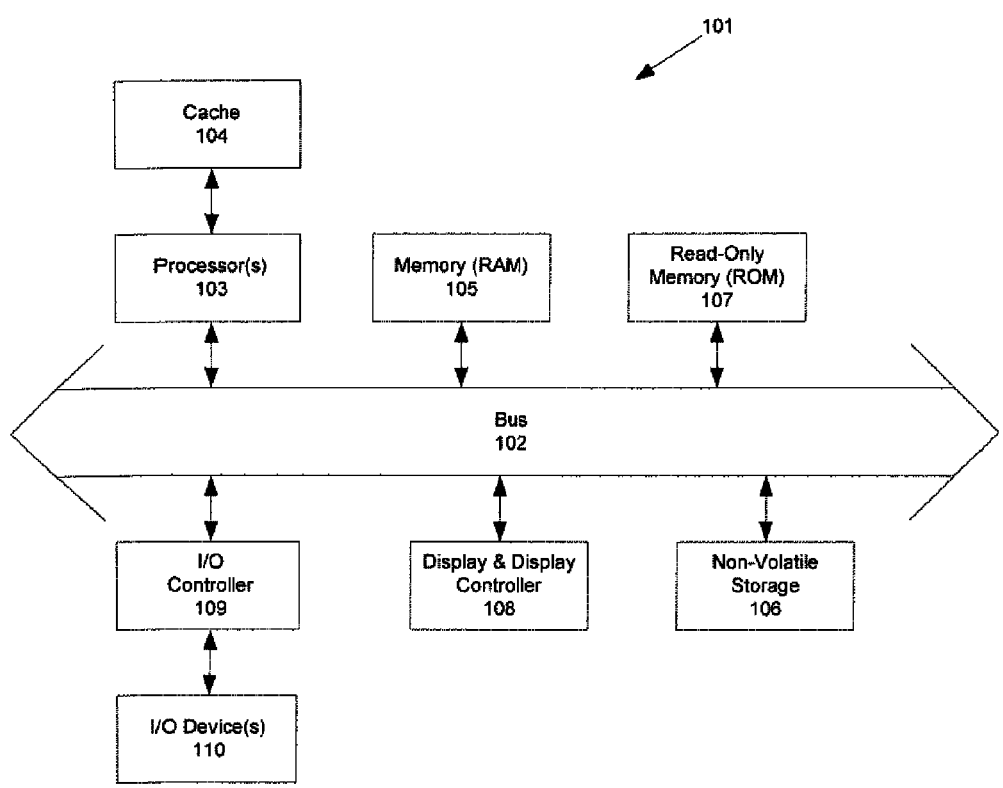
FIG. 2 shows a block diagram example of a data processing system which may be used with the present invention.

FIG. 2 shows one example of a typical computer system which may be used with the present invention. Note that while FIG. 2 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 2 may, for example, be a Sun workstation, or a personal computer (PC) running a Windows operating system, or an Apple Macintosh computer.

As shown in FIG. 2, the computer system 101, which is a form of a data processing system, includes a bus 102 which is coupled to a microprocessor 103 and a ROM 107 and volatile RAM 105 and a non-volatile memory 106. The microprocessor 103 is coupled to cache memory 104 as shown in the example of FIG. 2. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 1A:
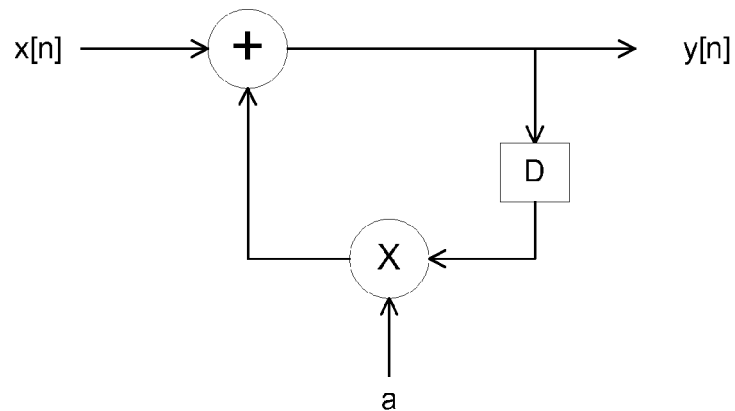
FIGS. 1A-1C illustrate exemplary representations of a design with circuit schematic and data flow graph.
Figure 1B:
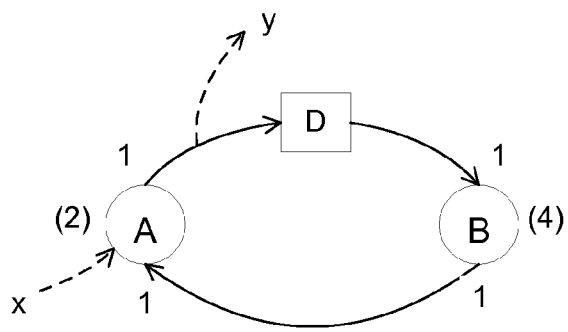
Figure 1C:
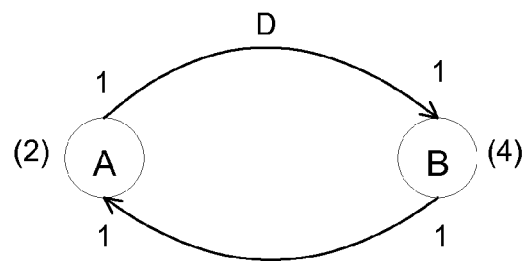

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Figure 3A:
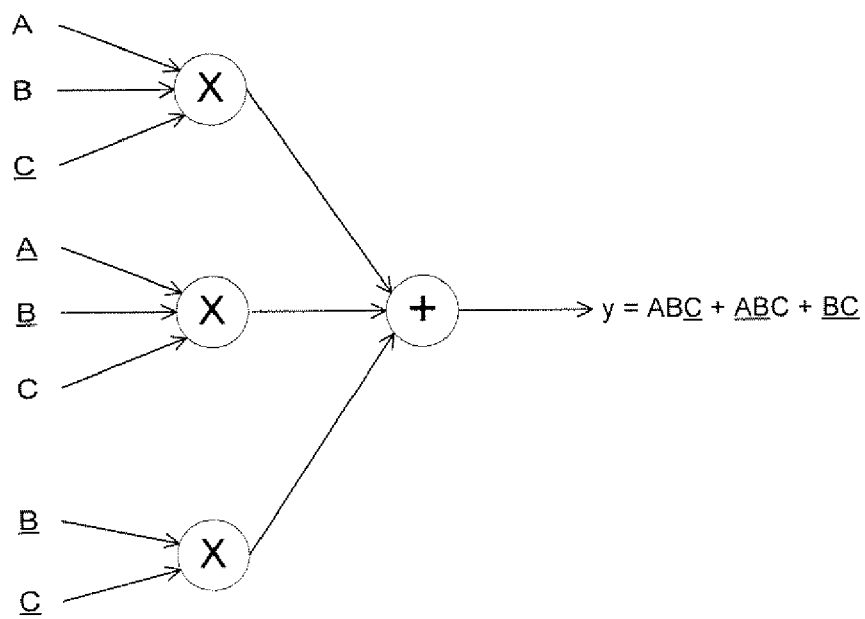
FIGS. 3A-3B illustrate an exemplary circuit operation level optimization.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc. Circuit optimization at a circuit operation level is an important part of design, mainly to reduce wasted operations, achieving desired timing and footprint while preserving functionality. FIG. 3A illustrates an exemplary function y=ABC+ABC+BC with A, B, C representing complementary A, $\overline{B}$, $\overline{C}$ respectively. The circuit block diagram shows three 3-input multiplication modules and one 3-input addition module, arranged to provide the function y.

The function y can be optimized at a circuit operation level, reducing the function y to an equivalent function with an addition of two products.

$$y = A\underline{BC} + \underline{AB}C + \underline{BC}$$

$$y = A\underline{BC} + \underline{AB}C + \underline{BC}(A + \overline{A})$$

$$y = A\underline{BC} + \underline{AB}C + \underline{BC}A + \underline{BC}\overline{A}$$

$$y = \underline{AB}(C + \underline{C}) + A\underline{C}(B + \underline{B})$$

$$y = \underline{AB} + A\underline{C}$$

Figure 3B:
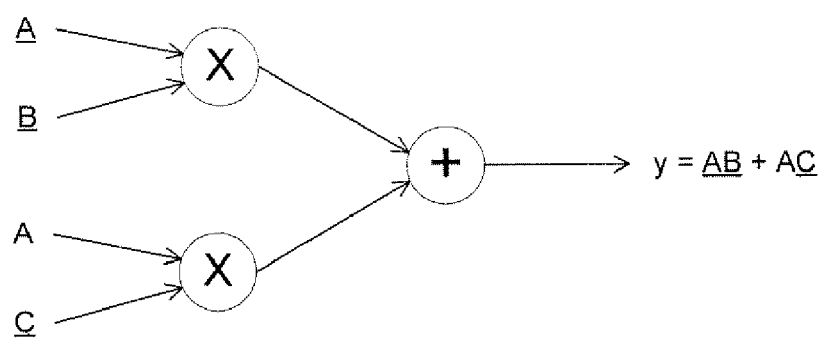

FIG. 3B illustrates the equivalent circuit block diagram representation of the same function y, after circuit operation level optimization. The new representation has only two 2-input multiplication modules and one 2-input addition module, and representing the same function. Thus circuit operation level optimization can provide simplification while preserving functionality.

Circuit operation level optimization is preferably operated on a circuit block diagram. For data flow graph, functionality is reduced to nodes, and thus operation level optimization is difficult, if not impossible. Therefore, optimizations at a circuit operation level and at a data flow level are two largely independent and separate operations. Optimization at a data flow level is preferably operated on a data flow graph.

Data flow graph is a technique for programming signal processors based on data flow, and which should ease the programming tasks by enhancing the modularity of code and permit algorithms to be describe more naturally, In addition, data flow processing provides concurrent implementation of DSP applications on parallel hardware. Typical data flow optimizations to be summarized below include pipelining, retiming, unfolding and folding. Detailed descriptions of data flow graph techniques can be found in "*VLSI Digital Signal Processing Systems: Design and Implementation*" by Keshab K. Parhi, Wiley-Interscience, 1999.

Pipelining is an operation at a data flow level, with the pipelining concept originated from water pipe where water is continued sent to the pipe without waiting for the water in the pipe to be out. Pipelining can lead to a reduction in critical data path, which can provide either clock speed increase or power consumption reduction. Pipelining can also be used in parallel processing where multiple outputs are computed in parallel in a clock period.

Figure 4A:
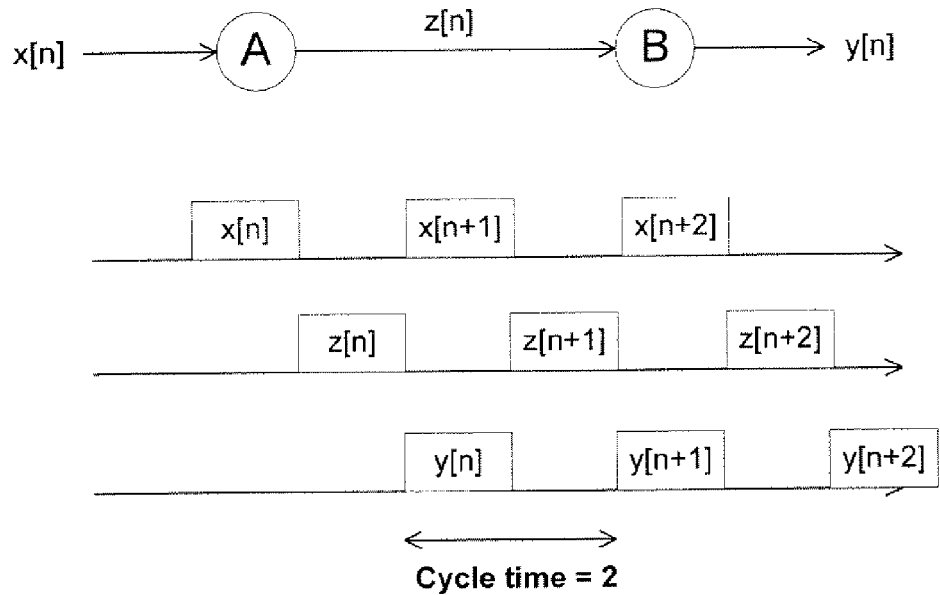
FIGS. 4A-4B illustrate an exemplary pipelining optimization for data flow representation.

Consider a data flow graph shown in FIG. 4A including node A and node B. Signal x[n] is provided to node A, generating output z[n], which is then provided to node B, generating output y[n]. Without pipelining, the signal x[n] has to propagate all the way to y[n], processed by both nodes A and B before the next signal x[n+1] can be sent. As shown in FIG. 4A, the delay between input signal x[n] and intermediate signal z[n] is the processing time of node A. Assuming that there is no delay in the signal path from node A to node B, signal z[n] appears immediately at input of node B after coming out of node A. And similarly, the delay time between signal z[n] and output signal y[n] is the processing time of node B. Thus output signal y[n] appears after the processing times of nodes A and B.

Without pipelining, the next signal x[n+1] has to wait until signal y[n] appears before reaching node A. In other words, signal z[n] is the input to node B, and thus cannot be changed until node B completes processing. The earliest that signal x[n+1] can be sent to node A is when node B completes processing, e.g., when the output signal y[n] appears. As can be seen in FIG. 4A, the cycle time of the data flow graph is 2, meaning that each input signal x requires the processing times of both nodes A and B.

Figure 4B:
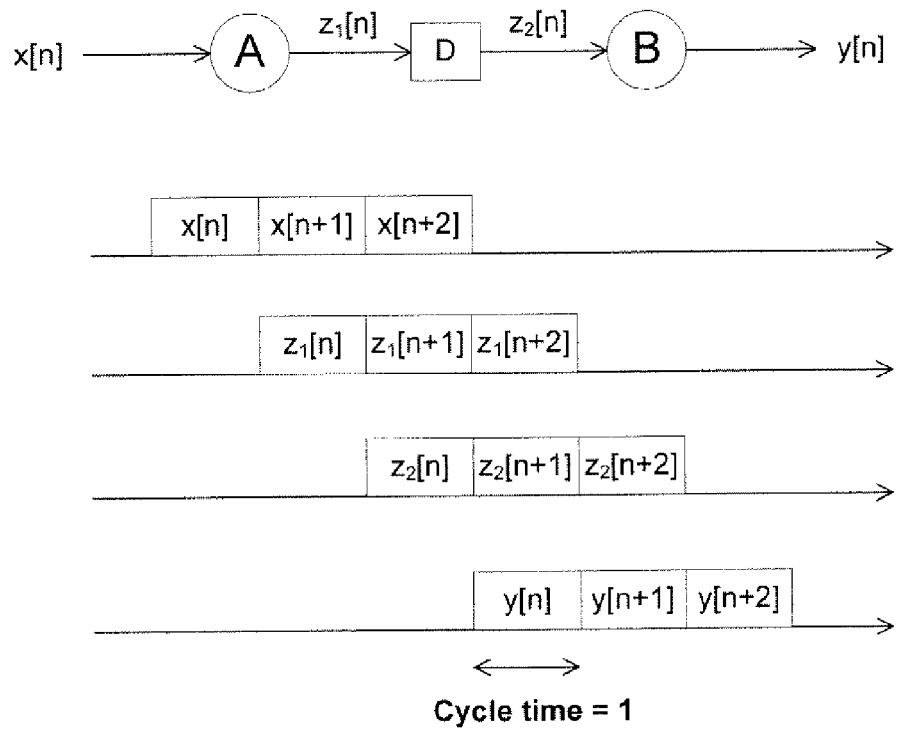

FIG. 4B illustrates the concept of pipelining as applied to the data flow graph of FIG. 4A. A delay D is introduced to the data path between node A and node B. The delay D can be sequential element such as a register, a memory cell, a flip-flop, or others. For example, a register samples and holds (stores) the input signal so that it can be output in synchronization with the clock of the circuit. Further, it is understood that one delay on an edge of a data flow graph represents a unit of latency typically introduced by the presence of a register on the corresponding path. However, the unit of latency can also be implemented through other means, such as different control signals for reading a memory cell.

With the addition of the delay D, signal x[n] passes through node A after a processing time of node A to become signal $z_1[n]$. Signal $z_1[n]$ is delayed by the delay element D before outputting as signal $z_2[n]$. After processed through node B, signal $z_2[n]$ becomes output signal y[n]. As shown in FIG. 4B, the time between the input signal x[n] and the output y[n] is longer by the delay time. However, as long as node A finishes processing, the next signal x[n+1] can be sent immediately, without waiting for it to propagate through node B. The input for node B is $z_2[n]$ which is not affected by the operation of node A, and only controlled by the clock to move signals through the delay element D. Thus the cycle time for the pipelining circuit of FIG. 4B is 1, meaning that each input signal x requires the processing time of either node A or node B, which ever is longer. The tradeoff of the pipelining optimization is the delay time of the initial output, meaning with the delay element D, the first output signal y would be delayed an extra delay time by the delay element D.

Alternatively, pipelining concept can be implemented with parallel processing since both techniques exploit concurrency available in the computation in different ways. Pipelining system processes the design in an interleave manner and parallel system processes the design in using duplicate hardware.

The pipelining concept can be generalized to a data flow graph. The technique is called retiming, which is also an operation at a data flow level, and includes a transformation to change the locations of delay elements in a design without affecting its input and output characteristics.

Retiming algorithms have been used to optimize a design of a circuit. Typically, a synchronous circuit works properly only when a signal propagates from one register to another along a combinational path, a path that does not include a register, such as a memory cell, a flip-flop, a delay element, etc., within a specified number of clock cycles (e.g., in one clock period). Thus, the maximum signal delay on the paths between the registers (e.g., due to the computation time of the combinational computing elements on a path and the wire delays) determines the minimum clock period in which the circuit can work properly. Registers may be placed or repositioned on a path of the circuit to reduce the maximum signal delay on the path and to reduce the clock period of the circuit. A general retiming algorithm may be used to redistribute some of the registers in the circuit, based on a timing model of the circuit to minimize the clock period.

Typically, the timing model of a circuit is obtained by putting together the timing models of the combinational computation units, delays (e.g., due to the registers), and interconnections that make up the circuit. Interconnect delays are hard to model and thus often ignored. A typical timing model for a circuit system that includes one or more circuit modules is generated from aggregating the timing models of the combinational computation units of the modules.

Algorithms for single rate retiming have been studied and formulated based on data flow graphs, for example, in "*VLSI Digital Signal Processing Systems. Design and Implementation*" by Keshab K. Parhi, pp. 91-118, Wiley-Interscience, 1999. For example, retiming algorithms include cutset retiming and pipelining. Further, there exist retiming algorithms for clock period minimization or register minimization using the data flow graph. Data flow graphs are composed of nodes that represent the combinational computation units and edges interconnecting them. Delays (e.g. registers) are represented as weights on the edges. Each node can have an execution time associated with it.

Figure 5A:
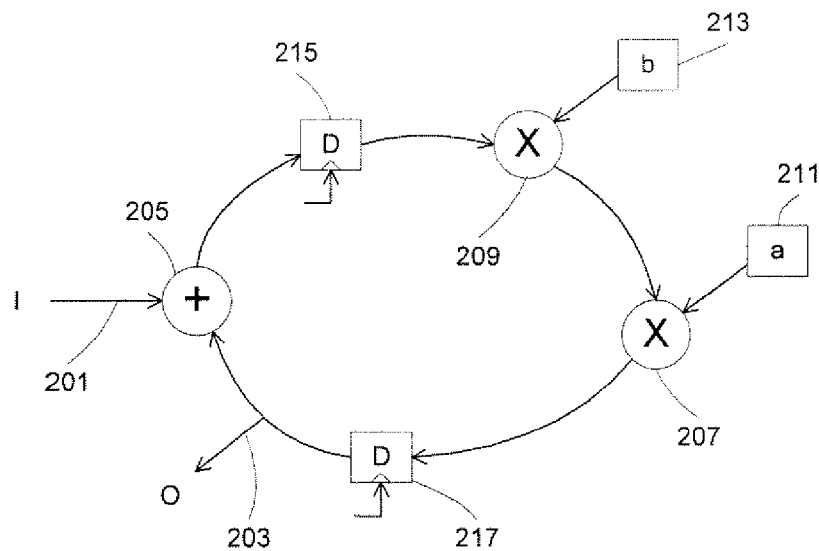
FIGS. 5A-5C illustrate a prior art method to construct a data flow graph for retiming.
Figure 5B:
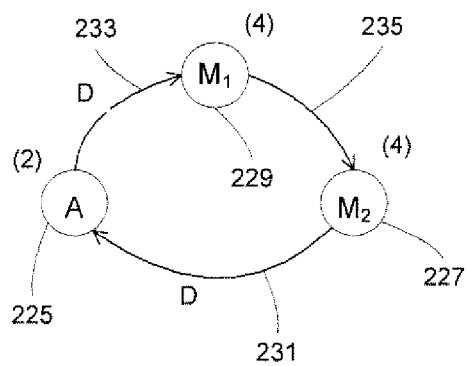
Figure 5C:
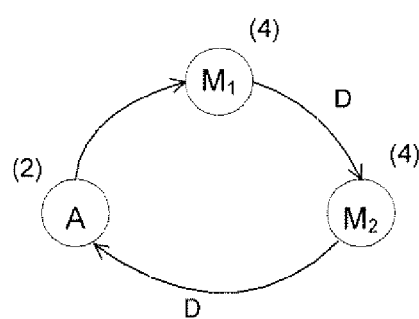

For example, FIGS. 5A-5C illustrate a prior art method to construct a data flow graph for retiming. FIG. 5A illustrates a circuit block diagram and FIG. 5B illustrates an equivalent data flow graph. The combinational computation units (e.g., adder 205, multipliers 207 and 209) in FIG. 5A are represented as computation nodes (e.g., nodes 225, 227 and 229 in FIG. 5B). Execution time at the combinational computation units is represented by the computation time of the nodes. For example, node 225 has a computation time of 2 ns, which is required by adder 205; and each of nodes 227 and 229 has a computation time of 4 ns, which is required by a multiplier (e.g., 209 or 207). Edge 231 represents the connection between multiplier 207 and adder 205. Edge 231 has a weight of 1, representing register 217 (or the one clock cycle latency due to register 217). Similarly, edge 233 has one delay representing register 215. Edge 235 represents the connection between multipliers 209 and 207; and, there is no delay associated with edge 235.

A critical path in a data flow graph is the path with the longest computation time among all paths that contain zero delay edges (combinatorial paths). For example, in FIG. 5B, the path from node 229 to node 227 contains edge 235 that has zero delay; and, the path from node 229 to node 227 takes the longest computation time (e.g., 8 ns, of which 4 ns are for node 229 and 4 ns for node 227). Thus, the minimum clock period for the circuit in FIG. 2 is 8 ns.

A retiming process would include changing the locations of the delay elements (e.g., delay D in edges 231 and 233 in data flow graph 5B). FIG. 5C illustrates a retimed data flow graph, where the delay on edge 233 can be moved to edge 235. The critical path becomes the path between nodes 225 and 229, which takes only 6 ns of computation time. Thus, moving the delay from edge 233 to edge 235 allows the modified (retimed) data flow graph to be operated at a reduced clock period of 6 ns. The modified data flow graph after the retiming process optimization at a data flow level can be implemented to hardware by moving register 215 from between adder 205 and multiplier 209 to between multipliers 209 and 207.

The clock speed of the output design can be maximized, e.g. by applying a known retiming algorithm for clock period minimization. These retiming algorithms are formulated on data flow graphs. Hardware modules, often containing registers and memories, do not directly fit in as single nodes. Thus, the circuit diagram is translated into data flow graph with a combination of nodes and edges in order to sufficiently represent their timing behavior. For example, the circuit design is broken down into the actual registers and combinational computing elements that make up the module and assigning one node to each combinational computing element. Typically, circuit modules in a design are translated into a set of nodes and edges that correspond to the combinational units in the modules and the nets connecting them. In other words, the timing model of each hardware module is typically constructed by putting together the timing models of the combinational computation units, delays, and interconnections that make up the hardware module. The aggregation of the set of nodes and edges used in the translation of a particular hardware module is effectively the timing model (data flow graph) of that hardware module.

A timing model of a hardware module can be constructed using data from a detailed implementation of the data flow graph model. This data is obtained by feeding an increasing number of registers into the module; retiming (and optimizing) the hardware module; and detecting the critical path within the module as new registers are added to determine the minimum clock period of the module.

Figure 6A:
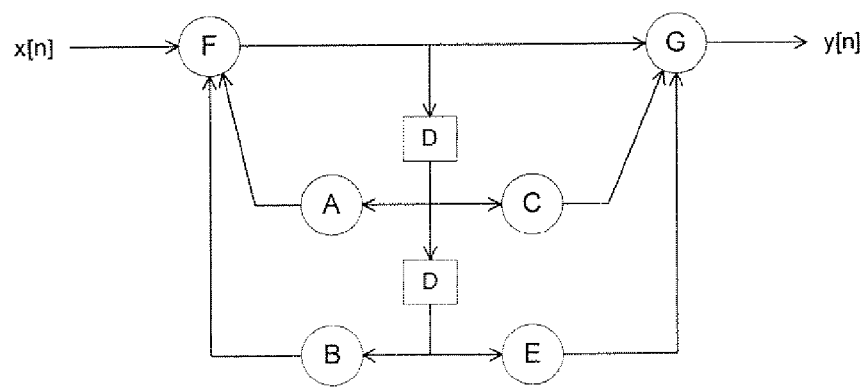
FIGS. 6A-6C illustrate an exemplary un-optimized system.
Figure 6B:
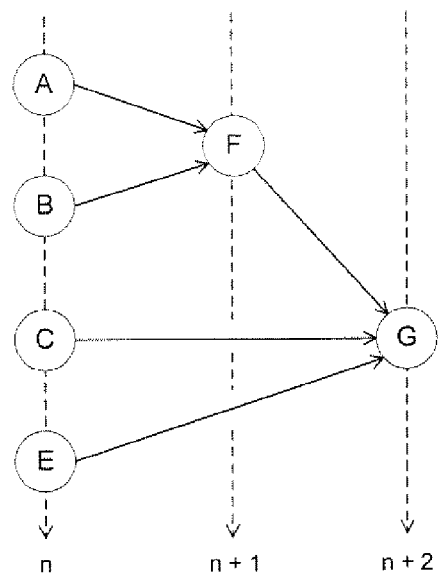
Figure 6C:
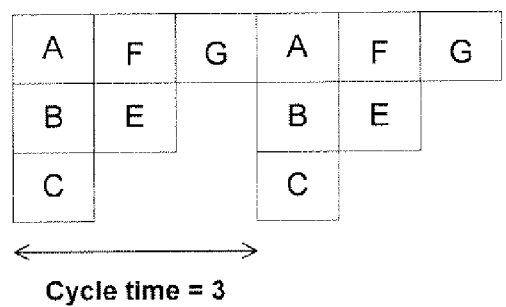

Retiming algorithm can be used to improve timing on parallel hardware. FIG. 6A illustrates a data flow graph for a second order recursive digital filter, Nodes F and G represents adders, nodes A, B, C, and E represent multipliers, and block D represents delay on the edges. From the data flow graph, the nodes cannot run in an arbitrary order. The precedence between the nodes is illustrated in FIG. 6B, which shows that nodes A and B have to be completed before node F, and nodes C, E and F have to be completed before node C. Thus, nodes A and B run first, node F runs second, and node G runs third. Nodes C and E can be distributed either in first or second, For a 3-processor scheduling as shown in FIG. 6C, the cycle time is 3.

Figure 7A:
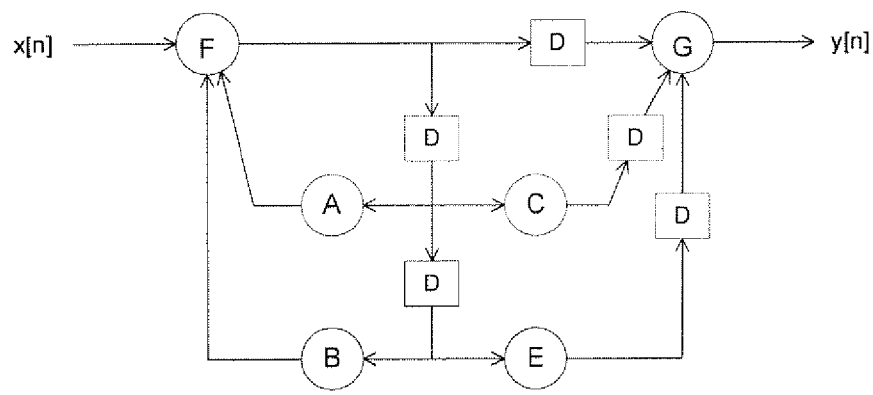
FIGS. 7A-7C illustrate an exemplary optimized system using parallel processors.
Figure 7B:
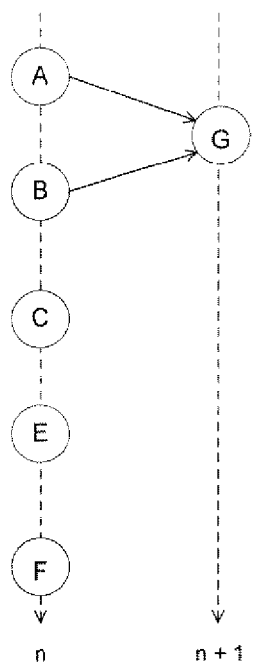
Figure 7C:
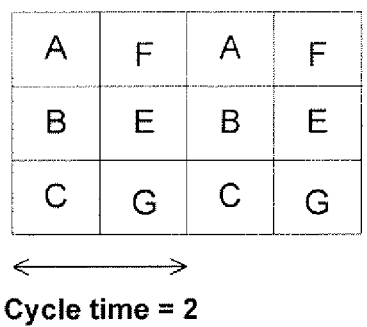

FIG. 7A illustrates the same data flow graph after calculating and implementing a retiming algorithm where three delays are added to the edges to node G. With the retimed graph, the precedence between the node changes as shown in FIG. 7B. There are only two orders with nodes A, B, C, E, and F in one and node G in another. For scheduling and mapping to a 3-processor hardware, the cycle time is improved to 2 as shown in FIG. 7C.

Another transformation of data flow graph is unfolding, where new programs are created to describe more than one iteration of the original program. For example, unfolding a data graph by a factor of 2 describes 2 consecutive iterations of the data graph. Unfolding can reveal hidden concurrencies so that the design can be scheduled to a smaller iteration period, thus increasing the throughput of the implementation. Unfolding can also used to design parallel processing architectures from serial processing architectures.

Figure 8A:
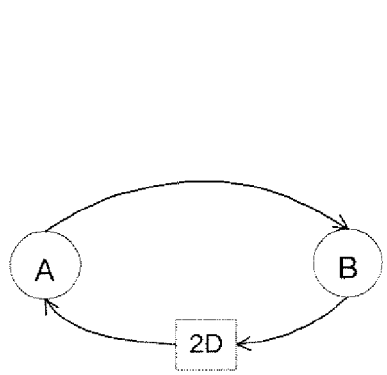
FIGS. 8A-8B illustrate an exemplary unfolding transformation.

For example, consider a DSP program y[n]=ay[n−2]+x[n] whose data flow graph is shown in FIG. 8A. The samples are considered to be running indefinitely, thus n can go from zero to infinity. If the index n is replaced with 2k and 2k+1, the above program can be represented by 2 following programs which describe 2 consecutive iterations:

$$y[2k]=ay[2k-2]+x[2k]$$

$$y[2k+1]=ay[2k-1]+x[2k+1]$$

Figure 8B:
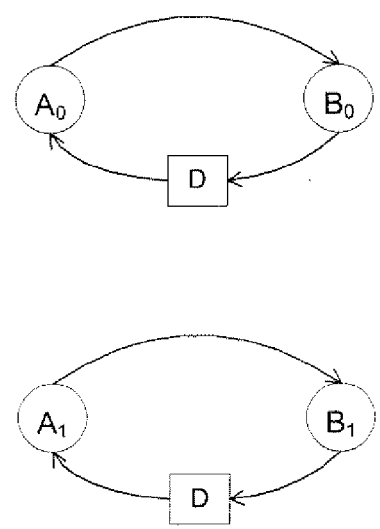

For example, for k=3, the 2 equations are y[6]=ay[4]+x[6] and y[7] ay[5]+x[7], which are the same for the original program with n=6 and n=7. The data flow graph representation for the unfolding transformation is shown in FIG. 8B.

Figure 9A:
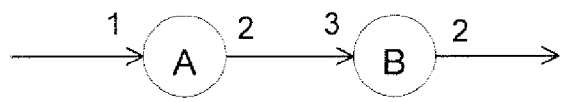
FIGS. 9A-9C illustrate another exemplary unfolding transformation.
Figure 9B:
Figure 9C:
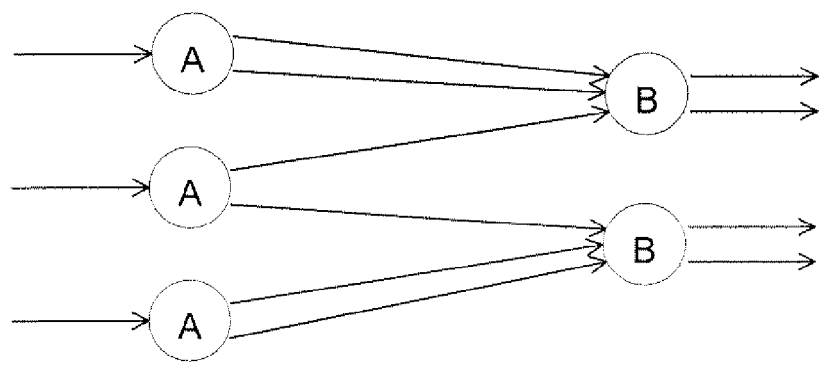

Unfolding transformation can be used to unfold multirate system to single rate system. FIG. 9A illustrates a data flow graph representation of a multirate system, comprising nodes A and B. The numbers associated with a node represent the input and output samples of that node. For example, node A takes one input data and generates two output data, and node B takes three input data and generates two output data, as shown in FIG. 9B. FIG. 9C illustrates an unfolding transformation to convert the multirate data graph of FIG. 9A to a single rate data graph where the nodes are duplicated and the outputs of node A are matched with the inputs of node B.

Another optimization transformation is folding where multiple operations are time multiplexed to a single functional unit. By executing multiple operations in only one functional unit, the number of functional units can be reduced, resulting in a reduction in chip area. The tradeoff of chip area reduction is the increase in frequency where the time multiplexed functional units have to run at multiple clock frequency values. Folding algorithm can be implemented for single or multiple clocks. Since folding changes clock frequency of the functional units, multirate system can be used to further reduce the chip area than the single rate system.

Figure 10:
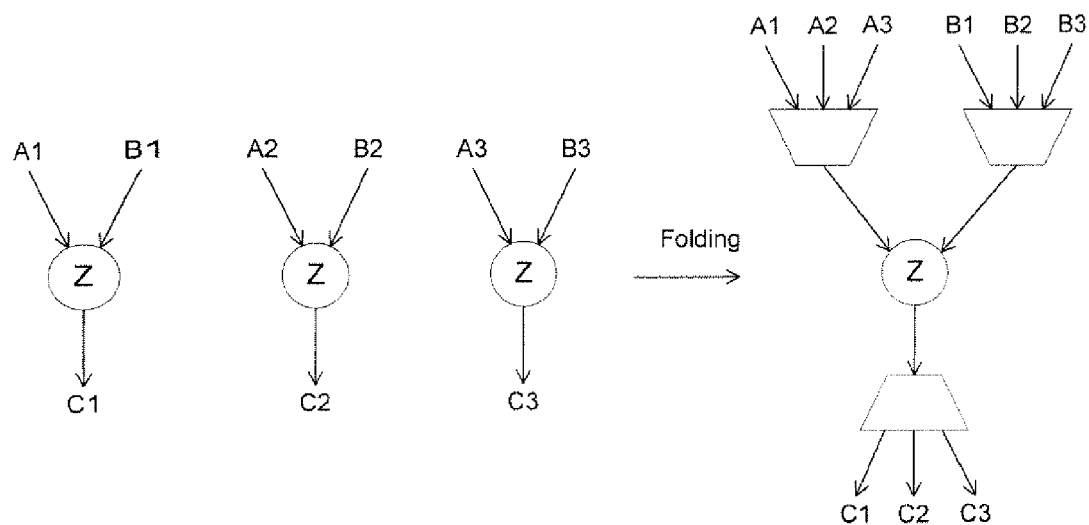
FIG. 10 illustrates an exemplary folding transformation.

FIG. 10 illustrates the folding transformation concept, where three identical functional units (representing by same node Z) run on different inputs and generate different outputs. The folding transformation reduces the number of functional units to one, and introduces a number of multiplexers for the inputs and outputs for the remaining functional unit. The folding factor is 3, meaning three functional units are folded into one. The clock frequency for the remaining functional unit is likewise increase by the same folding factor, with the inputs and outputs are time multiplexed by the control signals of the multiplexers.

In an embodiment, the present optimization can be applied to circuit design representation, and preferably to multirate circuits. In an aspect, the present optimization applied circuit operation level optimization to data flow graph, for example, to reduce wasted operations and redundant circuitry resulted from data graph transformations. For example, resampling operations can introduce redundant circuitry such as downsampler (or decimator) can have terminated outputs or upsampler (or interpolator) can have zero inputs, which cab be optimized for better circuitry, timing or chip area.

FIG. 11A illustrates an exemplary sample sine wave input sequence with time index n. FIG. 11B illustrates a downsampler by 3 where two samples are terminated for every three sample inputs. The sine frequency of the output downsampler is reduced by a factor of 3. In terms of data flow graph representation, FIG. 11C illustrates a representation of the downsampler by 3. The index n is replaced by indexes 3k, 3k+1 and 3k+2. Only the output y[3k] corresponded to the input x[3k] is carried to the next stage, while the other two inputs x[3k+1] and x[3k+2] are terminated and not used at all. Since the terminated inputs x[3k+1] and x[3k+2] are not used, they can be optimized away according to embodiments of the present invention.

FIG. 12A illustrates an exemplary sample sine wave input sequence with time index n. FIG. 12B illustrates an upsampler by 3 where two samples are added for every sample input. The sine frequency of the output upsampler is thus increased by a factor of 3. In terms of data flow graph representation, FIG. 12C illustrates a representation of the upsampler by 3. The index n is replaced by indexes 3k, 3k+1 and 3k+2. The output y[3k] is corresponded to the input x[3k], and the other two outputs y[3k+1] and y[3k+2] are generated from zero inputs x[3k+1] and x[3k+2]. Since the inputs x[3k+] and x[3k+2] are zero inputs, they can be optimized according to embodiments of the present invention.

Downsampler can suffer from aliasing since any frequencies present in the original signal will be mapped somewhere in the decimated signal's spectrum. Upsamplers can introduce high frequency images, resulted from rapid variations between successive samples. Thus downsamplers are often preceded by an anti-aliasing filter and upsamplers are often followed by an anti-imaging filter. Other techniques can include polyphase algorithms.

Figure 13:
FIGS. 13, 14A-14B, 15, 16 and 17A-17C illustrate an exemplary optimization methodology according to a preferred embodiment of the present invention.

FIGS. 13-17 illustrate an example of the present optimization at a circuit operation level on a data flow graph. FIG. 13 illustrates a rate changer or a re-sampler circuit, including a 3-upsampler, a filter and a 2-downsampler. FIG. 14A illustrates a circuit block diagram of the rate changer circuit of FIG. 13, using a 3-tap finite impulse response (FIR) filter. The circuit includes a 3-upsampler, a 2-downsampler, delay $z^{-1}$, adders, and multiplier with coefficients $b_0$, $b_1$, and $b_2$. FIG. 14B illustrates a multirate data flow graph representation of the same rate changer circuit. The adders are converted to nodes $A_1$ and $A_2$, and the multipliers are converted to nodes $M_1$, $M_2$ and $M_3$. The 3-upsampler is converted to node B having one input and 3 outputs, as shown in the vicinity of node B. The 2-downsampler is converted to node C, having 2 inputs and one output, as shown in the vicinity of node C. Nodes A and node M each consumes 1 input and generate one output, as shown in the vicinity of each node. The edges from node B to node $M_2$ and from node B to node $M_3$ each have a delay D. The data flow graph can be considered as multirate system, with different sampling rates for different portions of the design.

Figure 14A:
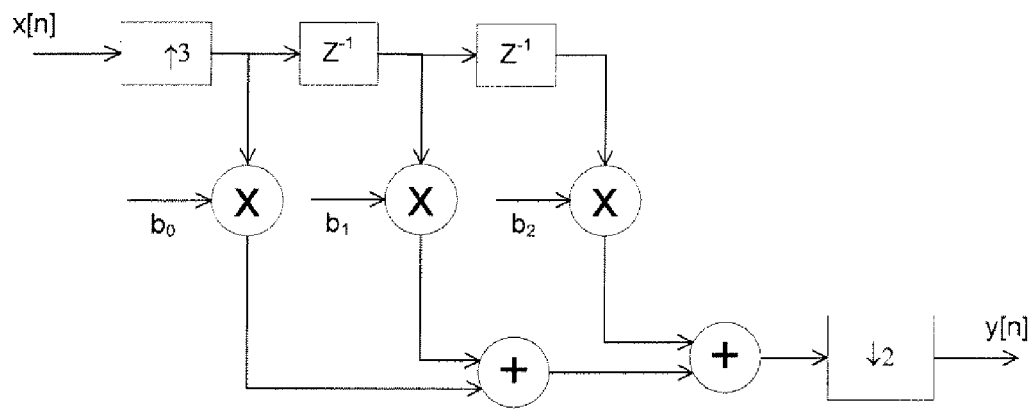
Figure 14B:
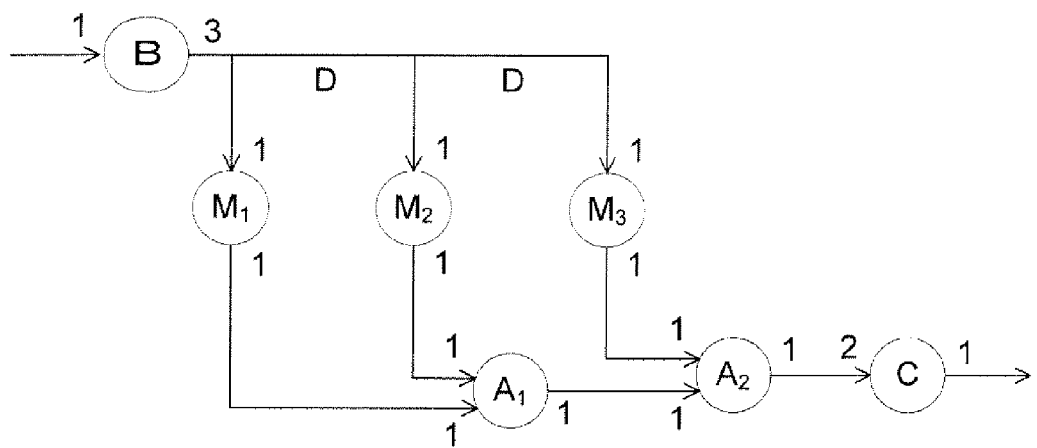

The present invention recognizes that optimizing the data flow graph shown in FIG. 14B directly at a data flow level might miss simplifying the circuit at a circuit operation level. Further, optimizing the multirate data flow graph shown in FIG. 14B can be complicated with less chance of finding an optimum schedule for mapping to programmable hardware devices. Thus in an embodiment, the present invention performs optimizing the data flow graph at a circuit operation level. In another embodiment, the present invention converts (e.g., unfolds) the multirate data flow graph to a single rate data flow graph before optimization, either at a data flow level or at a circuit operation level.

The data flow graph of FIG. 14B is first converted to block diagram as shown in FIG. 14A. Nodes A and B are converted into adders, using addition circuit association not included in the data flow graph. The delay D in the data path is also replaced by a delay register $z^{-1}$, clocked by a clock signal.

With the up 3 and down 2 rate changers, a least common multiple would be 6. The multirate system is converted to single rate system by unfolding each clock domain with a factor that is inversely proportional to the clock. For example, the up 3 upsampler ↑3 is unfolded with a factor of 6/3=2 and the down 2 downsampler ↓2 is unfolded with a factor of 6/2=3. The upsampler is further provided with zero inputs and some of the downsampler's outputs are terminated. The single rate unfolded system is shown in FIG. 15.

Figure 15:
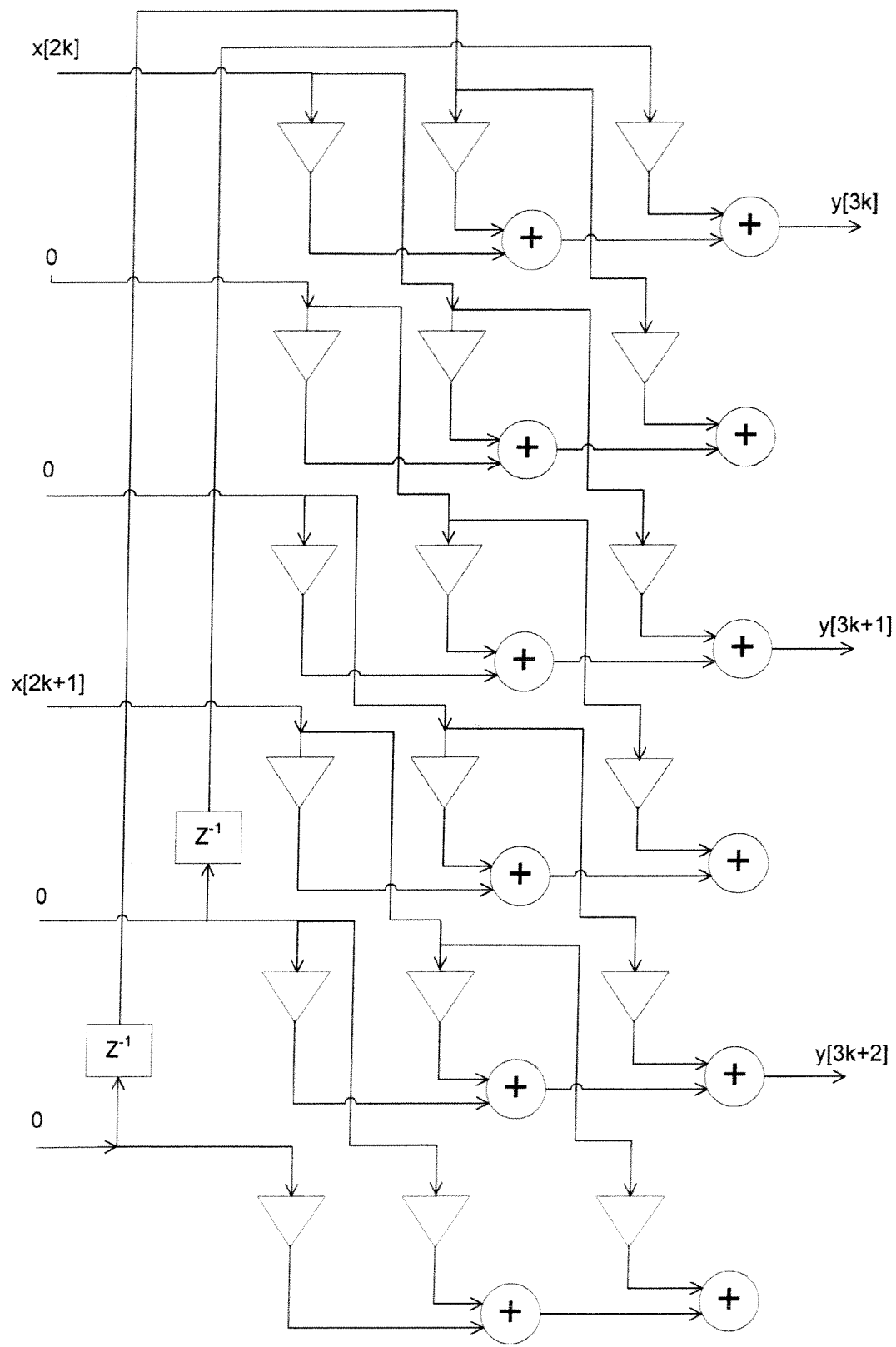
Figure 16:
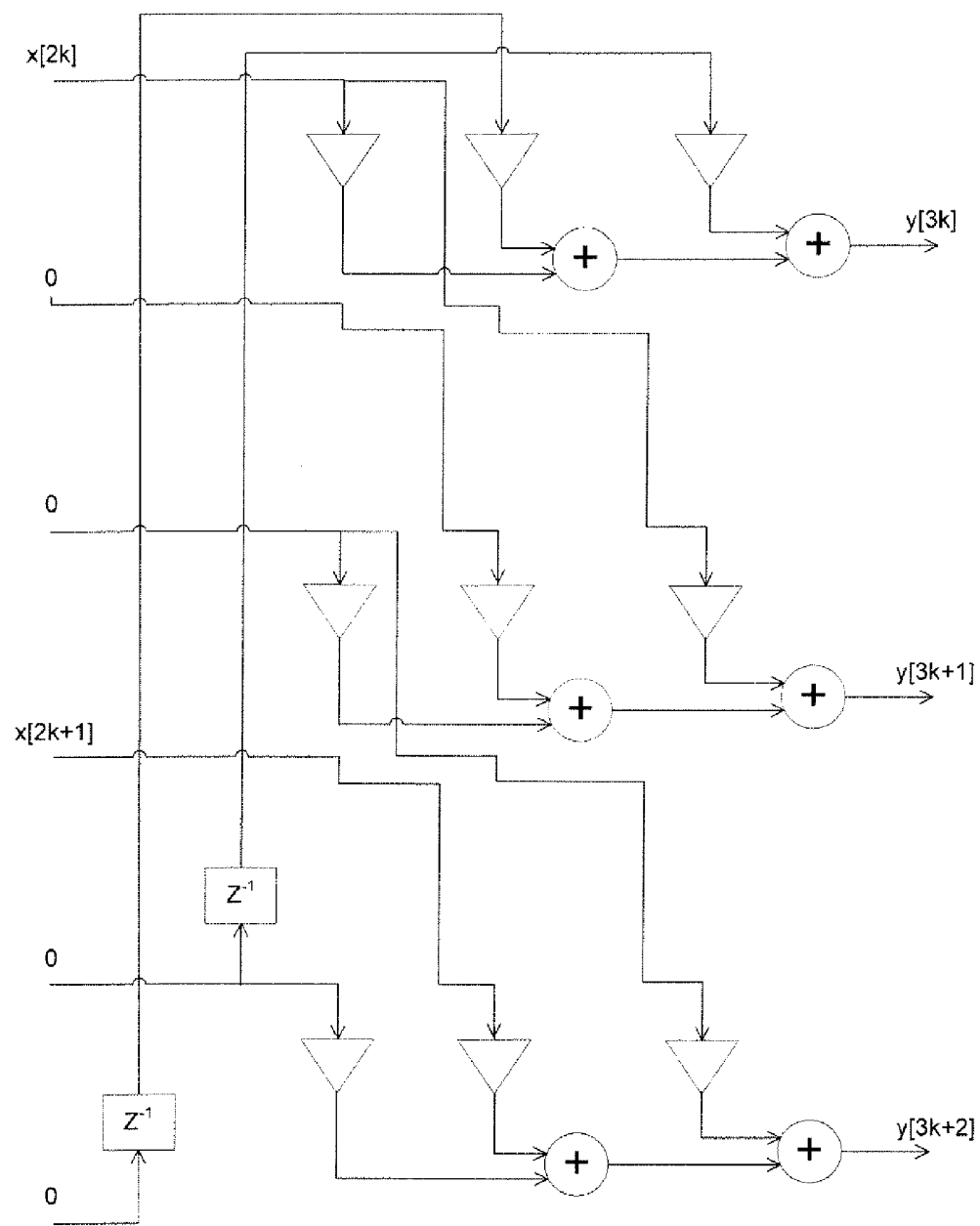
Figure 17A:
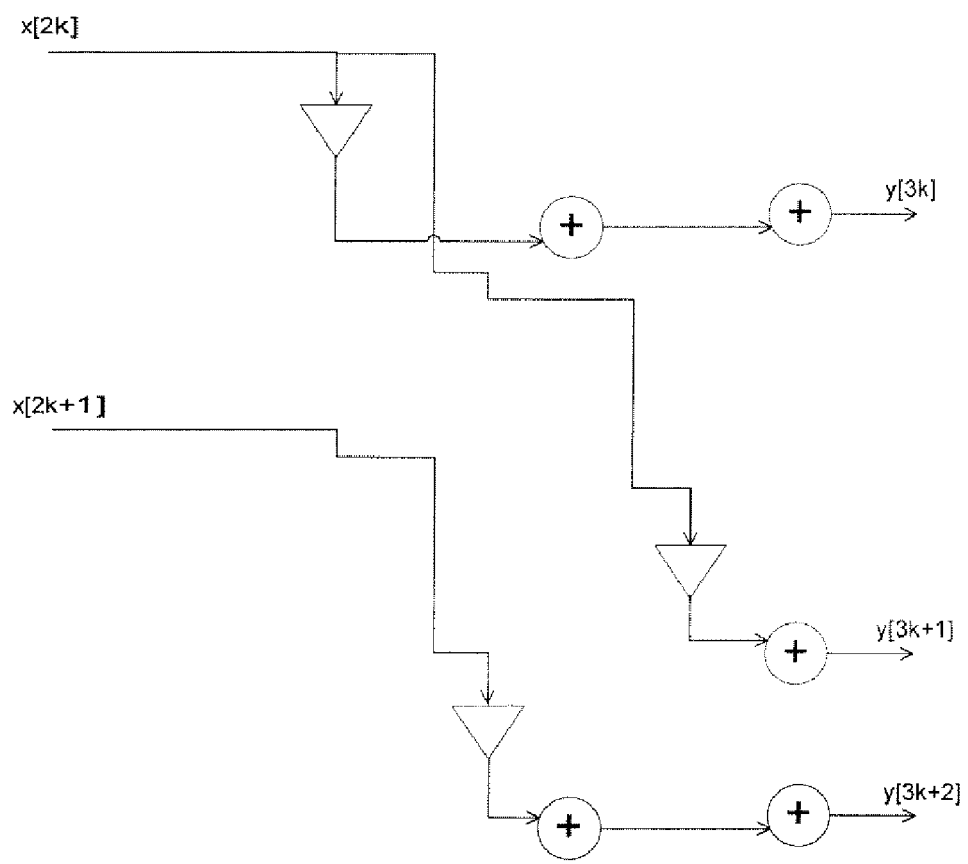
Figure 17B:
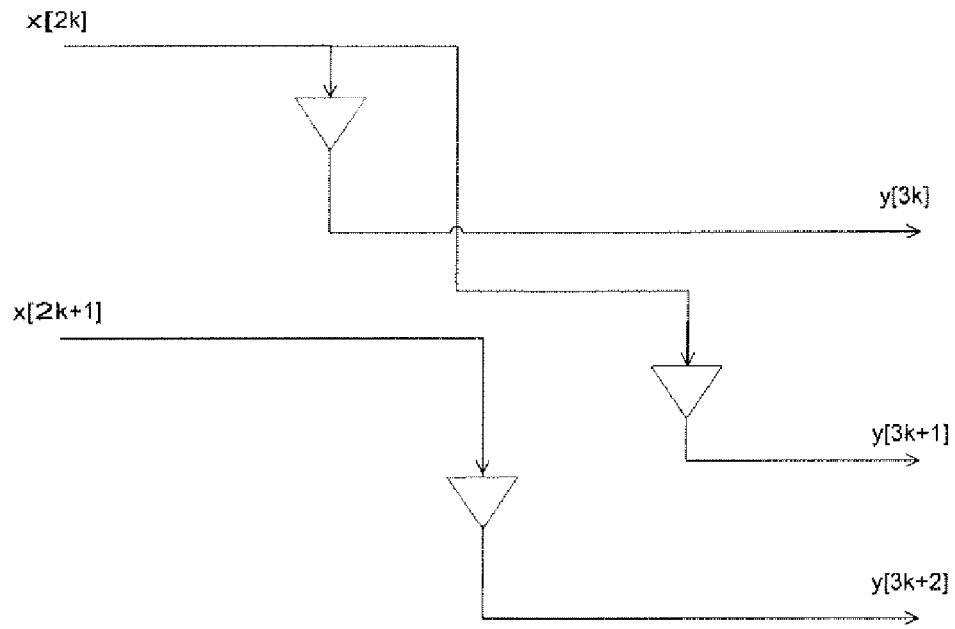

Applying operation level optimization to the circuit of FIG. 15, for example, by eliminating unused output ports, together with optimizing away related blocks by back propagation, results in the circuit of FIG. 16. Further optimizing by eliminating zero inputs by zero source propagation, eliminating gains and adders from FIG. 16 results in the circuit of FIG. 17A. Finally by further eliminating the adders with only one input of FIG. 17A results in the circuit of FIG. 17B. A data flow graph representation of FIG. 17B is shown in FIG. 17C.

Figure 17C:
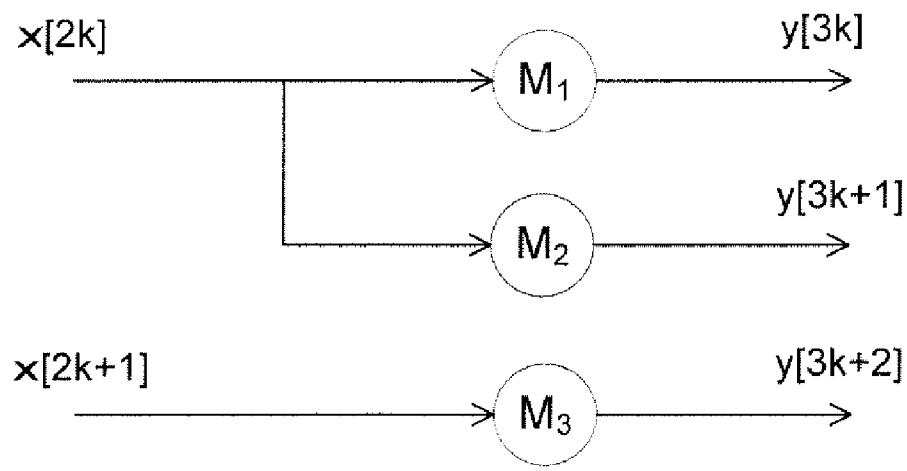

From the optimized circuit of FIG. 17C, optimizations using data flow graph can be applied, such as scheduling, folding, retiming and mapping to hardware. Since the circuit is a single rate system as a result from converting the multirate system using the present unfolding algorithm, optimizing using single rate system can be used. The present method can achieve the result of FIG. 17C by optimizing a data flow graph representation at a circuit operation level, and by unfolding a multirate data flow graph representation of FIG. 14B to a single rate data flow graph representation.

Figure 18:
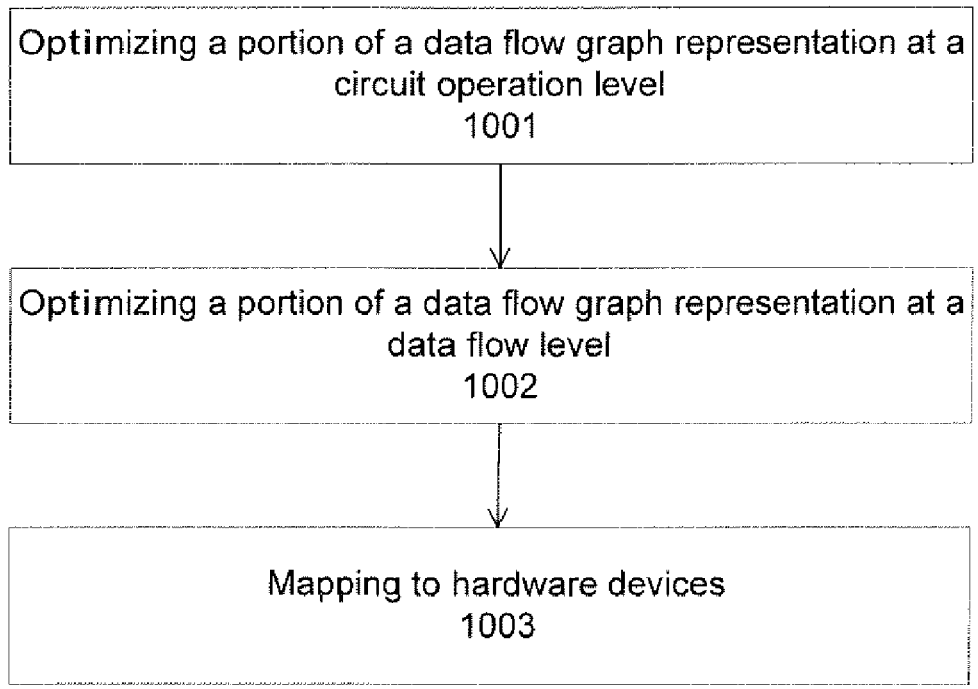
FIG. 18 shows a method to design a circuit module according to an embodiment of the present invention.

FIG. 18 shows a method to design a circuit module according to an embodiment of the present invention. The circuit module is represented by a data flow graph representation or implementation, for example, by representing a functional unit with a node, and by representing a data path between function units with an edge. Alternatively, a functional unit can sometimes be represented within the data flow graph representation A register controlled by a clock signal between the data path is represented by a delay value (such as a latency unit). With the data flow graph representing the circuit module, operation 1001 optimizes a portion of this data flow graph representation at a circuit operation level, for example, by converting to a functional equivalent design with circuit-optimized characteristics. The optimization at a circuit operation level can generate a circuit-optimized data flow graph representation by modifying the circuit design while preserving the functionality. The modification is preferably performed to achieve better timing, better chip area, lower power, fewer hardware components, or to achieve a desired objective. For example, the optimization using circuit operation level can comprise optimization using logical equivalent circuitry or calculation. The optimization can perform on resamplers, decimators or interpolators, preferably after unfolding the decimators or interpolators. After an unfolding transformation, the downsamplers (or decimators) can have unused outputs which can present wasted operations or redundant circuitry. These unused outputs can be optimized by circuit operation level optimization. Also, the upsamplers (or interpolators) can have zero inputs which can be optimized by circuit operation level optimization.

In an aspect, when the portion of the data flow graph representation of the circuit comprises a node representing a circuit function, the method further comprises converting the node to the circuit function before optimizing the portion of the data flow graph representation at a circuit operation level. In addition, the method can comprise converting any edges of the data flow graph representation to data paths, and inserting delay register to the data path with delay characteristics.

After being optimized by operation level optimization, the data flow graph representation can be optimized at a data flow level, for example, by using linear programming techniques such as data flow algorithms, as shown in operation 1002. The optimization using data flow algorithms can include folding, unfolding, scheduling, and retiming to achieve a desired objective, such as a clock rate. The data flow graph representation preferably comprises nodes and edges with delays, and thus the method further comprises converting functional units to nodes and data paths to edges before optimizing at a data flow level. In an embodiment, the optimizing the data flow graph at a data flow level occurs after the optimizing the data flow graph representation of the circuit at a circuit operation level.

After the data flow optimization, the design is mapped into hardware components in operation 1003, The optimization and mapping can be performed on single processor or on parallel processors. In an embodiment, the mapping of the optimized data flow graph representation comprises mapping the optimized data flow graph to a programmable hardware device; implementing the optimized data flow graph to a circuit; or scheduling the optimized data flow graph to one of a single processor, a multiprocessor, sequential processors, and parallel processors.

Figure 19:
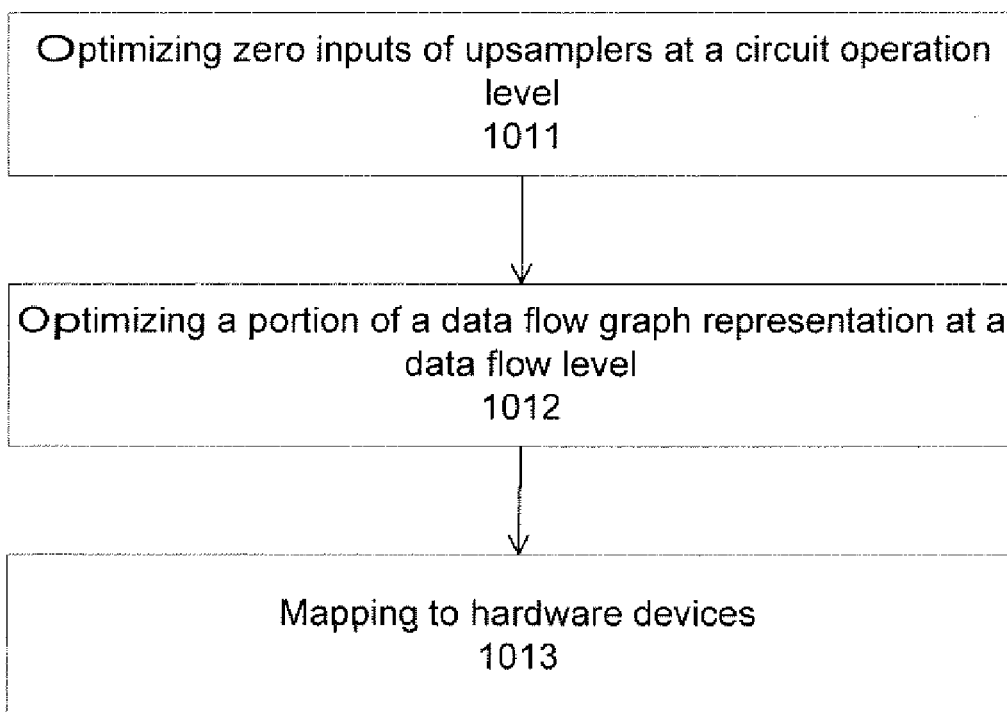
FIGS. 19-20 illustrate two optimization schemes according to an embodiment of the present invention.

FIG. 19 illustrates an optimization scheme according to an embodiment of the present invention. The optimization scheme optimizes zero inputs of upsamplers at a circuit operation level, for example, eliminating zero inputs caused by interpolators (operation 1011). Zero inputs can present wasted operations if not modified. Further, zero inputs within data flow graph might not be recognized as redundant circuitry or wasted operation, and thus the present design methodology performs circuit operation level optimization on data flow graph representation, preferably on zero inputs caused by upsamplers, to improve the circuit operations. Operation 1012 continues the optimization of a portion of the data flow graph representation at a data flow level with data flow algorithms and maps to hardware devices (operation 1013). In an embodiment, the optimization at a data flow level occurs after the optimization at a circuit operation level. Optimizing upsampler circuits at a circuit operation level can produce a circuit-optimized data flow graph representation, for example, by eliminating redundant operations related to zero inputs of upsampler circuits, and this circuit-optimized data flow graph representation then undergoes optimization at a data flow level to produce an optimized data flow graph.

Figure 20:
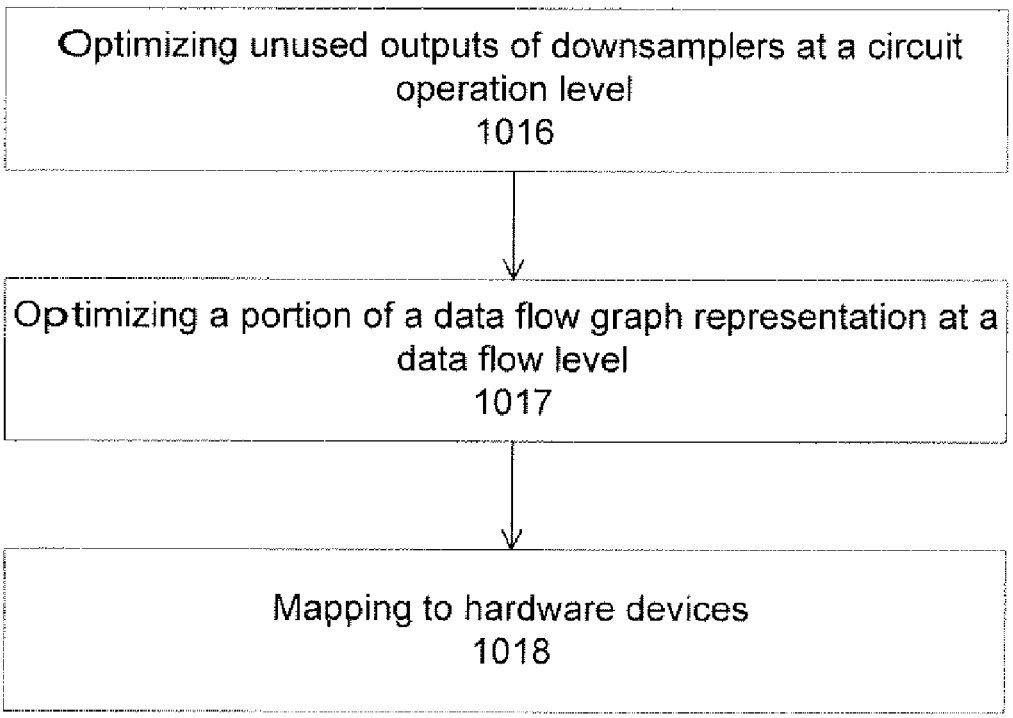

FIG. 20 illustrates another optimization scheme according to an embodiment of the present invention. The optimization scheme uses circuit operation level to optimize unused outputs of downsamplers, for example, caused by decimators (operation 1016). Similar to zero inputs, unused outputs can present wasted operations if not modified. Also, unused outputs within data flow graph might not be recognized as redundant circuitry or wasted operation, and thus the present design methodology performs operation level optimization on data flow graph representation, preferably on unused outputs caused by downsamplers, to improve the circuit operations. Operation 1017 continues the operation level optimization with data flow algorithms and maps to hardware (operation 1018). In an embodiment, the optimization at a data flow level occurs after the optimization at a circuit operation level. Optimizing downsampler circuits at a circuit operation level can produce a circuit-optimized data flow graph representation, for example, by eliminating redundant operations related to unused outputs of downsampler circuits, and this circuit-optimized data flow graph representation then undergoes optimization at a data flow level to produce an optimized data flow graph.

Figure 21:
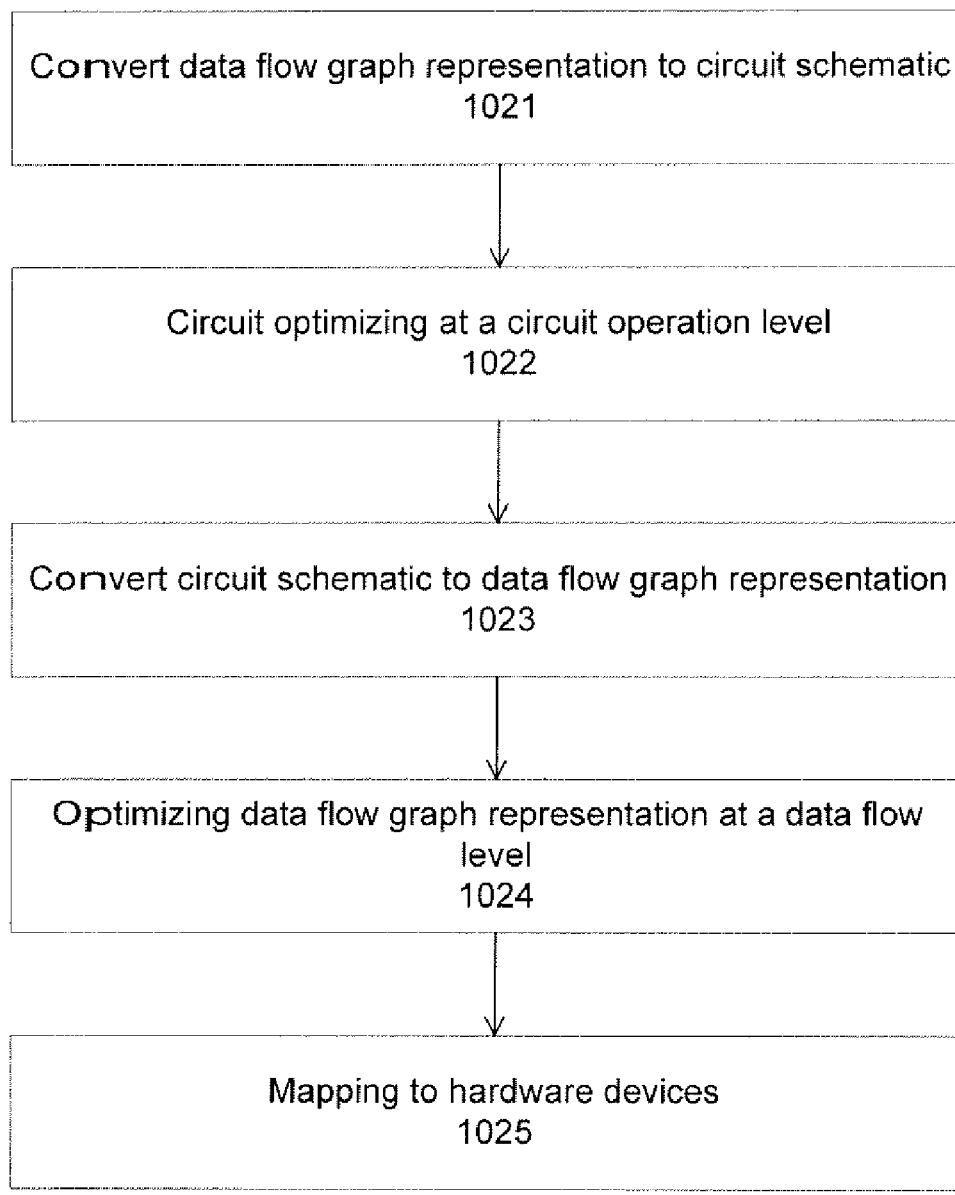
FIG. 21 shows a method to design a circuit module according to another embodiment of the present invention.

FIG. 21 shows a method to design a circuit module according to another embodiment of the present invention. Starting from a circuit design, a circuit diagram of a design, or from a data flow graph representation of a design, operation 1021 converts a portion of the data flow graph representation to circuit schematic or block diagram. The conversion can comprise converting edges to data flow path with delay registers inserted for delay edges. The conversion can also convert nodes to functional units, preferably with the help of addition external information since typically, data flow graph does not carry functionality information. With the data graph portions converted to circuit schematic, circuit operation level optimization on these portions can be performed (operation 1022). These optimizations can eliminate wastes and redundancy, and can improve the circuit design from the circuit operation point of view, a feat that could be difficult under data graph representation. In an aspect, these optimizations are performed on zero inputs of upsamplers or unused outputs of downsamplers. After circuit operation level optimizations, e.g., optimization at a circuit operation level, the circuit schematic can be converted back to data flow representation in operation 1023. The conversion to data flow graph is typically a reversal of the conversion to circuit schematic, with functional units replaced by nodes and data path replaced by edges, with or without delays. Operation 1024 continues the operation level optimization with data flow algorithms, e.g., optimization the data flow graph representation at a data flow level, and maps to hardware (operation 1025). Other aspects of the optimizations can be included, for example, optimization at a data flow level occurs after the optimization at a circuit operation level, optimization at a data flow level can comprise folding, unfolding, timing or scheduling, and mapping to hardware can comprise mapping to programmable hardware devices, implementing the optimized data flow graph representation, or scheduling to single or multiple processors.

Figure 22:
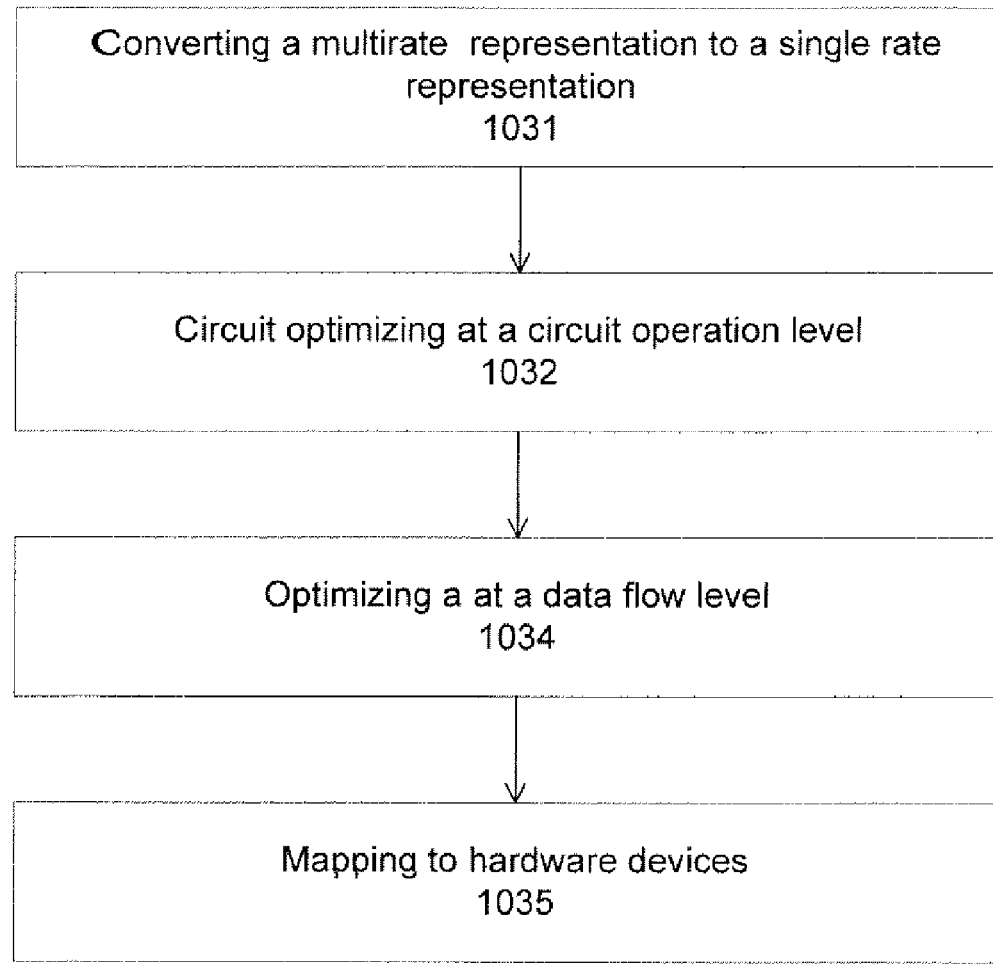
FIGS. 22-24 show preferred methods to design a circuit module according to an embodiment of the present invention.

FIG. 22 shows a preferred method to design a circuit module according to an embodiment of the present invention. Operation 1031 converts a portion of a multirate system representation to a single rate system representation. The representation can be a data flow graph representation. The multirate representation can include implementations with different frequencies, different clock domains, and functional nodes with different input/output samples. The multirate representation can also include resamplers, upsamplers or downsamplers. After converting to single rate representation, operation 1032 optimizes the converted single rate representation at a circuit operation level. The circuit operation level optimization can include converting a data flow graph representation to a circuit schematic representation for ease of circuit optimization. Re-conversion to data flow graph representation might also be implemented after circuit operation level optimization. Operation 1034 continues with an optimization at a data flow level, and then maps to hardware (operation 1035). Data flow optimization with single rate representation can be much simpler, together with using simpler algorithms associated with single rate representation, and thus can provide a better chance of finding optimum scheduling of the design to single processor or to multiple parallel processors.

Figure 23:
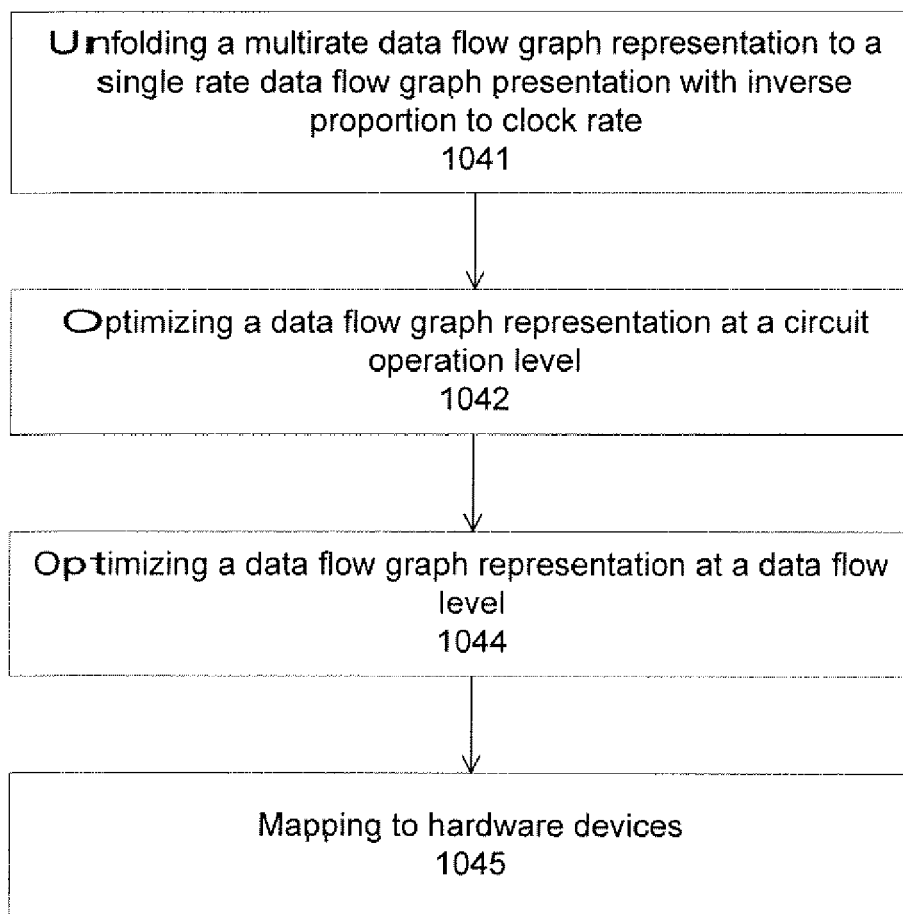

FIG. 23 illustrates a preferred embodiment for design optimization. Operation 1041 unfolds multirate system representation such as a data flow graph to a single rate representation using a minimum unfolding factor that is inversely proportional with the clock values. A least common multiple factor can be calculated from the clock values of different clock domains to be used as a common factor. The minimum unfolding factor can be the least common multiple factor divided by the clock value for each clock domain. For example, a 2 to 3 resampler system can comprise a 3-upsampler and a 2-downsampler. The common factor can be 6, and thus the unfolding factor for the input 3-upsampler is set to 2, the unfolding factor for the output 2-downsampler is set to 3, and the unfolding factor for the resampler logic is set to 6.

After the single rate conversion by unfolding factors, operation 1042 then optimizes the converted single rate representation at a circuit operation level to produce a data flow graph. The optimization can include optimization using logic equivalent, optimizing away zero inputs caused by upsamplers and optimizing away unused ports caused by downsamplers. Operation 1044 continues with an optimization at a data flow level, and then maps to hardware (operation 1045).

Figure 24:
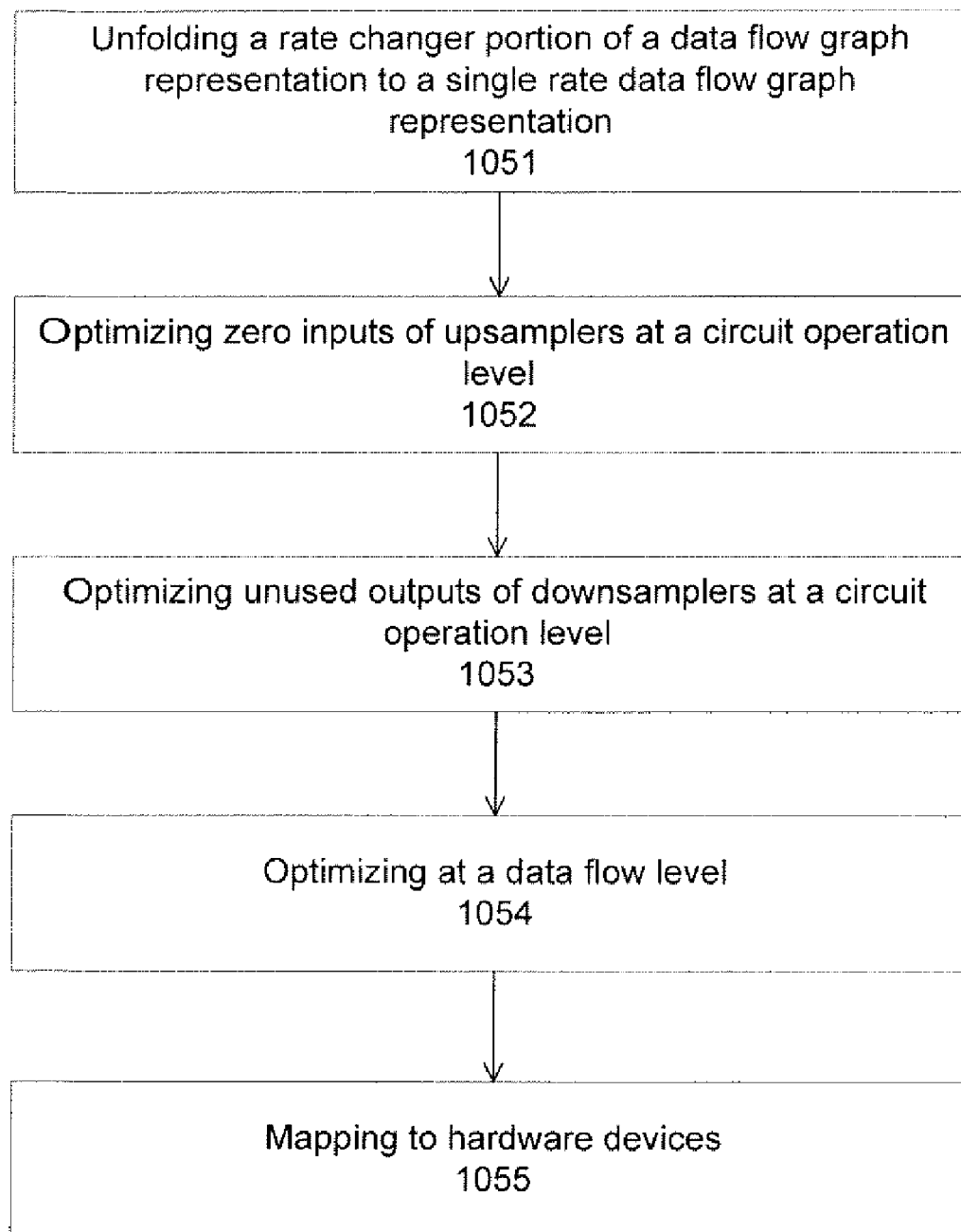

FIG. 24 illustrates a preferred embodiment for design optimization. Operation 1051 unfolds a rate changer portion of a data flow graph representation to a single rate data flow graph representation. After the single rate conversion by unfolding, operation 1052 optimizes away the zero inputs and its related circuitry of the upsamplers at a circuit operation level. Operation 1053 then optimizes away the unused outputs and its related circuitry of the downsamplers at a circuit operation level. Operation 1054 continues with an optimization at a data flow level, and then maps to hardware (operation 1055).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to design a circuit, comprising:
   converting each node representing a circuit function in a portion of a data flow graph representation of the circuit into a corresponding circuit function block;
   optimizing the portion of the data flow graph representation of the circuit at a circuit operation level to produce a data flow graph; and
   optimizing, by a data processing system, the data flow graph at a data flow level to produce an optimized data flow graph.

2. The method as in claim 1 wherein the optimizing the data flow graph at the data flow level occurs after the optimizing the portion of the data flow graph representation of the circuit at the circuit operation level.

3. The method as in claim 1 wherein the optimizing the portion of the data flow graph representation of the circuit at the circuit operation level comprises optimizing using logical equivalent circuitry.

4. The method as in claim 1 wherein the optimizing the data flow graph at the data flow level comprises at least one of folding a portion of the data flow graph, unfolding a portion of the data flow graph, retiming a portion of the data flow graph, and finding an optimum scheduling algorithm.

5. The method as in claim 1 further comprising one of:
   mapping the optimized data flow graph to a programmable hardware device;
   implementing the optimized data flow graph to a circuit; and
   scheduling the optimized data flow graph to one of a single processor, a multiprocessor, sequential processors, and parallel processors.

6. A non-transitory machine readable medium containing executable computer program instructions which when executed by a digital processing system cause said system to perform a method to design a circuit, the method comprising:
   converting each node representing a circuit function in a portion of a data flow graph representation of the circuit into a corresponding circuit function block;
   optimizing the portion of the data flow graph representation of the circuit at a circuit operation level to produce a data flow graph; and
   optimizing the data flow graph at a data flow level to produce an optimized data flow graph.

7. The medium as in claim 6 wherein the optimizing the data flow graph at the data flow level occurs after the optimizing the portion of the data flow graph representation of the circuit at the circuit operation level.

8. The medium as in claim 6 wherein the optimizing the portion of the data flow graph representation of the circuit at the circuit operation level comprises optimizing using logical equivalent circuitry.

9. The medium as in claim 6 wherein the optimizing the data flow graph at the data flow level comprises at least one of folding a portion of the data flow graph, unfolding a portion of the data flow graph, retiming a portion of the data flow graph, and finding an optimum scheduling algorithm.

10. The medium as in claim 6 wherein the method further comprises one of:
    mapping the optimized data flow graph to a programmable hardware device;
    implementing the optimized data flow graph to a circuit; and
    scheduling the optimized data flow graph to one of a single processor, a multiprocessor, sequential processors, and parallel processors.

11. A data processing system to design a circuit, the data processing system comprising:
    means for converting each node representing a circuit function in a portion of a data flow graph representation of the circuit into a corresponding circuit function block;
    means for optimizing the portion of the data flow graph representation of the circuit at a circuit operation level to produce a data flow graph; and
    means for optimizing the data flow graph at a data flow level to produce an optimized data flow graph.

12. The system as in claim 11 wherein the optimizing the data flow graph at the data flow level occurs after the optimizing the portion of the data flow graph representation of the circuit at the circuit operation level.

13. The system as in claim 11 wherein the means for optimizing the portion of the data flow graph representation of the circuit at the circuit operation level comprises means for optimizing using logical equivalent circuitry.

14. The system as in claim 11 wherein the means for optimizing the data flow graph at the data flow level comprises at least one of means for folding a portion of the data flow graph, means for unfolding a portion of the data flow graph, means for retiming a portion of the data flow graph, and means for finding an optimum scheduling algorithm.

15. The system as in claim 11 further comprising one of:
    means for mapping the optimized data flow graph to a programmable hardware device;
    means for implementing the optimized data flow graph to a circuit; and
    means for scheduling the optimized data flow graph to one of a single processor, a multiprocessor, sequential processors, and parallel processors.

16. A method to design a circuit, comprising:
    converting a multirate data flow graph representation of the circuit to a single rate data flow graph representation, wherein the circuit being represented by the multirate data flow graph representation comprises a plurality of clock domains;
    optimizing a portion of the single rate data flow graph representation at a circuit operation level to produce a data flow graph; and
    optimizing, by a data processing system, the data flow graph at a data flow level to produce an optimized data flow graph.

17. The method as in claim 16 wherein the converting the multirate data flow graph representation to the single rate data flow graph representation comprises unfolding the multirate data flow graph representation.

18. The method as in claim 17 wherein the unfolding the multirate data flow graph representation comprises unfolding the clock domains within the multirate data flow graph with an unfolding factor that is inversely proportional with clock values of the clock domains.

19. The method as in claim 16 wherein the portion of the single rate data flow graph representation of the circuit comprises a node representing a circuit function, and wherein optimizing the single rate data flow graph representation at a circuit operation level comprises converting the node to its corresponding circuit function before the optimizing the portion of the single rate data flow graph representation at the circuit operation level.

20. The method as in claim 16 wherein the optimizing the portion of the single rate data flow graph representation at the circuit operation level comprises optimizing using logical equivalent circuitry.

21. The method as in claim 16 wherein the circuit comprises a sample rate changer component, and wherein the optimizing the portion of the single rate data flow graph representation at the circuit operation level comprises one of optimizing zero inputs and optimizing unused outputs caused by the sample rate changer component.

22. The method as in claim 16 wherein the optimizing the data flow graph at the data flow level comprises at least one of folding a portion of the data flow graph, unfolding a portion of the data flow graph, retiming a portion of the data flow graph, and finding an optimum scheduling algorithm.

23. The method as in claim 22, wherein the retiming comprises at least one of adding a number of pipeline register sets to the portion of the data flow graph and removing a number of pipeline register sets from the portion of the data flow graph.

24. The method as in claim 16 further comprising one of:
mapping the optimized data flow graph to a programmable hardware device;
implementing the optimized data flow graph to a circuit; and
scheduling the optimized data flow graph to one of a single processor, a multiprocessor, sequential processors, and parallel processors.

25. A non-transitory machine readable medium containing executable computer program instructions which when executed by a digital processing system cause said system to perform a method to design a circuit, the method comprising:
converting a multirate data flow graph representation of the circuit to a single rate data flow graph representation, wherein the circuit being represented by the multirate data flow graph representation comprises a plurality of clock domains;
optimizing a portion of the single rate data flow graph representation at a circuit operation level to produce a data flow graph; and
optimizing the data flow graph at a data flow level to produce an optimized data flow graph.

26. The medium as in claim 25 wherein the converting the multirate data flow graph representation to the single rate data flow graph representation comprises unfolding the multirate data flow graph.

27. The medium as in claim 26 wherein the unfolding the multirate data flow graph representation comprises unfolding the clock domains within the multirate data flow graph with an unfolding factor that is inversely proportional with clock values of the clock domains.

28. The medium as in claim 25 wherein the portion of the single rate data flow graph representation of the circuit comprises a node representing a circuit function, and wherein optimizing the single rate data flow graph representation at a circuit operation level comprises converting the node to its corresponding circuit function before the optimizing at the circuit operation level.

29. The medium as in claim 25 wherein the optimizing the portion of the single rate data flow graph representation at circuit operation level comprises optimizing using logical equivalent circuitry.

30. The medium as in claim 25 wherein the circuit comprises a sample rate changer component, and wherein the optimizing the portion of the single rate data flow graph representation at the circuit operation level comprises one of optimizing zero inputs and optimizing unused outputs caused by the sample rate changer component.

31. The medium as in claim 25 wherein the optimizing the data flow graph at the data flow level comprises at least one of folding a portion of the data flow graph, unfolding a portion of the data flow graph, retiming a portion of the data flow graph, and finding an optimum scheduling algorithm.

32. The medium as in claim 31, wherein the retiming comprises at least one of adding a number of pipeline register sets to the portion of the data flow graph and removing a number of pipeline register sets from the portion of the data flow graph.

33. The medium as in claim 25 wherein the method further comprises one of:
mapping the optimized data flow graph to a programmable hardware device;
implementing the optimized data flow graph to a circuit; and
scheduling the optimized data flow graph to one of a single processor, a multiprocessor, sequential processors, and parallel processors.

34. A data processing system to design a circuit, the data processing system comprising:
means for converting a multirate data flow graph representation of the circuit to a single rate data flow graph representation, wherein the circuit being represented by the multirate data flow graph representation comprises a plurality of clock domains;
means for optimizing a portion of the single rate data flow graph representation at a circuit operation level to produce a data flow graph; and
means for optimizing the data flow graph at a data flow level to produce an optimized data flow graph.

35. The system as in claim 34 wherein the means for converting a multirate data flow graph representation to the single rate data flow graph representation comprises means for unfolding the multirate data flow graph.

36. The system as in claim 35 wherein the means for unfolding the multirate data flow graph comprises means for unfolding the clock domains within the multirate data flow graph with an unfolding factor that is inversely proportional with clock values of the clock domains.

37. The system as in claim 34 wherein the portion of the single rate data flow graph representation of the circuit comprises a node representing a circuit function, and wherein optimizing the single rate data flow graph representation at a circuit operation level comprises means for converting the node to the circuit function before the means for optimizing at a circuit operation level.

38. The system as in claim 34 wherein the means for optimizing the portion of the single rate data flow graph representation at the circuit operation level comprises means for optimizing using logical equivalent circuitry.

39. The system as in claim 34 wherein the circuit comprises a sample rate changer component, and wherein the means for optimizing the portion of the single rate data flow graph representation at the circuit operation level comprises one of means for optimizing zero inputs and means for optimizing unused outputs caused by the sample rate changer component.

40. The system as in claim 34 wherein the means for optimizing the data flow graph at the data flow level comprises at least one of means for folding a portion of the data flow graph, means for unfolding a portion of the data flow graph, means for retiming a portion of the data flow graph, and means for finding an optimum scheduling algorithm.

41. The system as in claim 40, wherein the means for retiming comprises at least one of means for adding a number of pipeline register sets to the portion of the data flow graph and means for removing a number of pipeline register sets from the portion of the data flow graph.

42. The system as in claim 34 further comprising one of:
means for mapping the optimized data flow graph to a programmable hardware device;
means for implementing the optimized data flow graph to a circuit; and
means for scheduling the optimized data flow graph to one of a single processor, a multiprocessor, sequential processors, and parallel processors.

43. A method to design a circuit, comprising:
unfolding a rate changer portion of a data flow graph representation of the circuit to a single rate data flow graph representation;
optimizing at least one of zero inputs and unused outputs resulted from unfolding the rate changer portion at a circuit operation level to produce a data flow graph; and
optimizing, by a data processing system the data flow graph at a data flow level to produce an optimized data flow graph.

44. The method as in claim 43 wherein a rate changer comprises one of an upsampler, a downsampler, a resampler, a decimator, and an interpolator.

45. The method as in claim 43 wherein optimizing at circuit operation level comprises optimizing using logical equivalent circuitry.

46. The method as in claim 43 wherein optimizing a data flow graph at a data flow level comprises at least one of folding a portion of the data flow graph, unfolding a portion of the data flow graph, retiming a portion of the data flow graph, and finding an optimum scheduling algorithm.

47. The method as in claim 43 further comprising one of
mapping the optimized data flow graph to a programmable hardware device;
implementing the optimized data flow graph to a circuit; and
scheduling the optimized data flow graph to one of a single processor, a multiprocessor, sequential processors, and parallel processors.

48. A non-transitory machine readable medium containing executable computer program instructions which when executed by a digital processing system cause said system to perform a method to design a circuit, the method comprising:
unfolding a rate changer portion of a data flow graph representation of the circuit to a single rate data flow graph representation;
optimizing at least one of zero inputs and unused outputs resulted from unfolding the rate changer portion at a circuit operation level to produce a data flow graph; and
optimizing the data flow graph at a data flow level to produce an optimized data flow graph.

49. The medium as in claim 48 wherein a rate changer comprises one of an upsampler, a downsampler, a resampler, a decimator, and an interpolator.

50. The medium as in claim 48 wherein optimizing at circuit operation level comprises optimizing using logical equivalent circuitry.

51. The medium as in claim 48 wherein optimizing a data flow graph at a data flow level comprises at least one of folding a portion of the data flow graph, unfolding a portion of the data flow graph, retiming a portion of the data flow graph, and finding an optimum scheduling algorithm.

52. The medium as in claim 48, said method further comprising one of
mapping the optimized data flow graph to a programmable hardware device;
implementing the optimized data flow graph to a circuit; and
scheduling the optimized data flow graph to one of a single processor, a multiprocessor, sequential processors, and parallel processors.

53. A data processing system to design a circuit, the data processing system comprising:
means for unfolding a rate changer portion of a data flow graph representation of the circuit to a single rate data flow graph representation;
means for optimizing at least one of zero inputs and unused outputs resulted from unfolding the rate changer portion at a circuit operation level to produce a data flow graph; and
means for optimizing the data flow graph at a data flow level to produce an optimized data flow graph.

54. The system as in claim 53 wherein a rate changer comprises one of an upsampler, a downsampler, a resampler, a decimator, and an interpolator.

55. The system as in claim 53 wherein said means for optimizing at circuit operation level comprises means for optimizing using logical equivalent circuitry.

56. The system as in claim 53 wherein said means for optimizing a data flow graph at a data flow level comprises at least one of means for folding a portion of the data flow graph, means for unfolding a portion of the data flow graph, means for retiming a portion of the data flow graph, and means for finding an optimum scheduling algorithm.

57. The system as in claim 53 further comprising one of
means for mapping the optimized data flow graph to a programmable hardware device;
means for implementing the optimized data flow graph to a circuit; and
means for scheduling the optimized data flow graph to one of a single processor, a multiprocessor, sequential processors, and parallel processors.

* * * * *